US012052446B2

(12) United States Patent
Ramaswamy et al.

(10) Patent No.: US 12,052,446 B2
(45) Date of Patent: *Jul. 30, 2024

(54) METHODS AND APPARATUS FOR MONITORING THE INSERTION OF LOCAL MEDIA INTO A PROGRAM STREAM

(71) Applicant: The Nielsen Company (US), LLC, New York, NY (US)

(72) Inventors: Arun Ramaswamy, Tampa, FL (US); Paul C. Kemper, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,642

(22) Filed: Oct. 17, 2022

(65) Prior Publication Data
US 2023/0037853 A1 Feb. 9, 2023

Related U.S. Application Data

(63) Continuation of application No. 16/428,313, filed on May 31, 2019, now Pat. No. 11,477,496, which is a
(Continued)

(51) Int. Cl.
H04N 21/234 (2011.01)
G11B 27/28 (2006.01)
(Continued)

(52) U.S. Cl.
CPC ....... *H04N 21/23424* (2013.01); *G11B 27/28* (2013.01); *G11B 27/3018* (2013.01);
(Continued)

(58) Field of Classification Search
CPC .......... H04N 21/23424; H04N 21/235; H04N 21/2407; H04N 21/25883;
(Continued)

(56) References Cited

U.S. PATENT DOCUMENTS 4,230,990 A 10/1980 Lert, Jr. et al.
5,019,899 A 5/1991 Boles et al.
(Continued)

FOREIGN PATENT DOCUMENTS

WO 03094499 A2 11/2003
WO 2005025217 A1 3/2005

OTHER PUBLICATIONS

Canadian Intellectual Property Office, "Notice of Allowance," issued in connection with application No. 2574998, dated May 28, 2015, 1 page.
(Continued)

*Primary Examiner* — Randy A Flynn

(57) ABSTRACT

Methods and apparatus for monitoring locally inserted media are disclosed. A disclosed apparatus includes instructions to detect, at a media device at an end user location, a frequency of a watermark that was spliced into a primary media stream received at the media device after the primary media stream was received at the end user location, associate identifying tags with segments of the primary media stream that were spliced, in response to the detection of the watermark, determine an advertisement associated with the segments of the primary media based on the identifying tags, present the primary media at a first time and the advertisement at second times, record a log including first identifying information including an identity of the content of the primary media and second identifying information including a change in the frequency of the watermark corresponding to the advertisement; and transmit the log to a data collection facility.

20 Claims, 12 Drawing Sheets

Related U.S. Application Data continuation of application No. 15/368,136, filed on Dec. 2, 2016, now Pat. No. 10,356,446, which is a continuation of application No. 14/556,095, filed on Nov. 28, 2014, now Pat. No. 9,544,622, which is a continuation of application No. 11/618,245, filed on Dec. 29, 2006, now Pat. No. 8,924,995, which is a continuation of application No. PCT/US2005/026426, filed on Jul. 25, 2005.

(60) Provisional application No. 60/590,626, filed on Jul. 23, 2004.

(51) Int. Cl.

| | | |
|---|---|---|
| *G11B 27/30* | (2006.01) | |
| *G11B 27/32* | (2006.01) | |
| *H04H 20/10* | (2008.01) | |
| *H04H 20/14* | (2008.01) | |
| *H04H 60/37* | (2008.01) | |
| *H04H 60/54* | (2008.01) | |
| *H04N 7/16* | (2011.01) | |
| *H04N 21/235* | (2011.01) | |
| *H04N 21/24* | (2011.01) | |
| *H04N 21/258* | (2011.01) | |
| *H04N 21/44* | (2011.01) | |
| *H04N 21/442* | (2011.01) | |
| *H04N 21/45* | (2011.01) | |
| *H04N 21/8352* | (2011.01) | |
| *H04N 21/845* | (2011.01) | |

(52) U.S. Cl.
CPC ......... *G11B 27/322* (2013.01); *H04H 20/103* (2013.01); *H04H 20/106* (2013.01); *H04H 60/37* (2013.01); *H04H 60/54* (2013.01); *H04N 7/163* (2013.01); *H04N 21/235* (2013.01); *H04N 21/2407* (2013.01); *H04N 21/25883* (2013.01); *H04N 21/25891* (2013.01); *H04N 21/44008* (2013.01); *H04N 21/44016* (2013.01); *H04N 21/44222* (2013.01); *H04N 21/4532* (2013.01); *H04N 21/8352* (2013.01); *H04N 21/8455* (2013.01); *H04H 20/14* (2013.01)

(58) Field of Classification Search
CPC ....... H04N 21/25891; H04N 21/44008; H04N 21/44016; H04N 21/44222; H04N 21/4532; H04N 21/8352; H04N 21/8455; H04N 7/163; G11B 27/28; G11B 27/3018; G11B 27/322; H04H 20/14; H04H 20/103; H04H 20/106; H04H 60/37; H04H 60/54
See application file for complete search history.

(56) References Cited

U.S. PATENT DOCUMENTS

| | | | |
|---|---|---|---|
| 5,425,100 A | 6/1995 | Thomas et al. | |
| 5,481,294 A | 1/1996 | Thomas et al. | |
| 5,512,933 A | 4/1996 | Wheatley et al. | |
| 5,543,856 A | 8/1996 | Rosser et al. | |
| 5,612,729 A | 3/1997 | Ellis et al. | |
| 5,629,739 A | 5/1997 | Dougherty | |
| 5,815,671 A | 9/1998 | Morrison | |
| 5,850,249 A | 12/1998 | Massetti et al. | |
| 5,872,588 A | 2/1999 | Aras et al. | |
| 5,907,366 A | 5/1999 | Farmer et al. | |
| 5,917,830 A | 6/1999 | Chen et al. | |
| 5,966,120 A | 10/1999 | Arazi et al. | |
| 6,029,045 A | 2/2000 | Picco et al. | |
| 6,061,793 A | 5/2000 | Tewfik et al. | |
| 6,308,327 B1 | 10/2001 | Liu et al. | |
| 6,546,051 B2 | 4/2003 | Ramaswamy | |
| 6,675,383 B1 | 1/2004 | Wheeler et al. | |
| 6,708,335 B1 | 3/2004 | Ozer et al. | |
| 6,735,775 B1 | 5/2004 | Massetti | |
| 7,039,932 B2 | 5/2006 | Eldering | |
| 7,239,981 B2 | 7/2007 | Kolessar et al. | |
| 7,440,674 B2 | 10/2008 | Plotnick et al. | |
| 7,761,327 B1 | 7/2010 | Hannah et al. | |
| 7,895,620 B2 | 2/2011 | Haberman et al. | |
| 7,930,716 B2 | 4/2011 | Liga et al. | |
| 2001/0032333 A1 | 10/2001 | Flickinger | |
| 2001/0056573 A1 | 12/2001 | Kovac et al. | |
| 2002/0057893 A1 | 5/2002 | Wood et al. | |
| 2002/0083439 A1 | 6/2002 | Eldering | |
| 2002/0087973 A1 | 7/2002 | Hamilton et al. | |
| 2002/0092019 A1 | 7/2002 | Marcus | |
| 2002/0120930 A1 | 8/2002 | Yona | |
| 2002/0124246 A1 | 9/2002 | Kaminsky et al. | |
| 2002/0143976 A1 | 10/2002 | Barker et al. | |
| 2002/0144262 A1 | 10/2002 | Plotnick et al. | |
| 2002/0162118 A1 | 10/2002 | Levy et al. | |
| 2002/0184047 A1 | 12/2002 | Plotnick et al. | |
| 2002/0186768 A1 | 12/2002 | Dimitrova et al. | |
| 2002/0194592 A1 | 12/2002 | Tsuchida et al. | |
| 2002/0196850 A1 | 12/2002 | Liu et al. | |
| 2002/0199189 A1 | 12/2002 | Prijatel et al. | |
| 2003/0012548 A1* | 1/2003 | Levy ................. | H04N 21/8358 713/176 |
| 2003/0039465 A1 | 2/2003 | Bjorgan et al. | |
| 2003/0126598 A1 | 7/2003 | Agnihotri et al. | |
| 2003/0177497 A1 | 9/2003 | Macrae et al. | |
| 2003/0210889 A1 | 11/2003 | Engle et al. | |
| 2004/0001161 A1 | 1/2004 | Herley | |
| 2004/0025176 A1 | 2/2004 | Franklin et al. | |
| 2004/0073916 A1 | 4/2004 | Petrovic et al. | |
| 2004/0190853 A1 | 9/2004 | Dow et al. | |
| 2005/0028189 A1 | 2/2005 | Heine et al. | |
| 2005/0033758 A1 | 2/2005 | Baxter | |
| 2006/0107302 A1 | 5/2006 | Zdepski | |
| 2007/0162927 A1 | 7/2007 | Ramaswamy et al. | |
| 2008/0155582 A1 | 6/2008 | Sokola et al. | |
| 2008/0275785 A1 | 11/2008 | Altberg et al. | |
| 2010/0268540 A1 | 10/2010 | Arshi et al. | |
| 2010/0268573 A1 | 10/2010 | Jain et al. | |
| 2011/0224992 A1 | 9/2011 | Chaoui et al. | |
| 2011/0320287 A1 | 12/2011 | Holt et al. | |
| 2015/0051967 A1 | 2/2015 | Steuer et al. | |
| 2017/0085926 A1 | 3/2017 | Ramaswamy et al. | |

OTHER PUBLICATIONS

Canadian Intellectual Property Office, "Office Action," issued in connection with application No. 2574998, dated Aug. 26, 2008, 4 pages.

Canadian Intellectual Property Office, "Office Action," issued in connection with application No. 2574998, dated Nov. 13, 2009, 10 pages.

Canadian Intellectual Property Office, "Office Action," issued in connection with application No. 257499826426, dated Mar. 23, 2009, 5 pages.

International Searching Authority, "International Preliminary Report on Patentability," issued in connection with application No. PCTUS05, dated Aug. 18, 2006, 8 pages.

International Searching Authority, "International Search Report," issued in connection with application No. PCTUS05, dated Aug. 18, 2006, 2 pages.

International Searching Authority, "Written Opinion," issued in connection with application No. PCTUS05, dated Aug. 18, 2006, 7 pages.

United States Patent and Trademark Office, "Advisory Action," issued in connection with U.S. Appl. No. 11/618,245, dated Sep. 30, 2009, 4 pages.

United States Patent and Trademark Office, "Advisory Action," issued in connection with U.S. Appl. No. 15/368,136, dated Dec. 28, 2018, 5 pages.

(56) References Cited

OTHER PUBLICATIONS

United States Patent and Trademark Office, "Final Office Action," issued in connection with U.S. Appl. No. 11/618,245, dated Dec. 31, 2013, 27 pages.

United States Patent and Trademark Office, "Final Office Action," issued in connection with U.S. Appl. No. 11/618,245, dated Jul. 21, 2009, 26 pages.

United States Patent and Trademark Office, "Final Office Action," issued in connection with U.S. Appl. No. 11/618,245, dated Oct. 26, 2011, 33 pages.

United States Patent and Trademark Office, "Final Office Action," issued in connection with U.S. Appl. No. 15/368,136, dated Nov. 24, 2017, 28 pages.

United States Patent and Trademark Office, "Final Office Action," issued in connection with U.S. Appl. No. 15/368,136, dated Oct. 10, 2018, 36 pages.

United States Patent and Trademark Office, "Final Office Action," issued in connection with U.S. Appl. No. 16/790,721, dated Jan. 21, 2021, 17 pages.

United States Patent and Trademark Office, "Non-final Office Action," issued in connection with U.S. Appl. No. 11/618,245, dated Apr. 11, 2011, 32 pages.

United States Patent and Trademark Office, "Non-final Office Action," issued in connection with U.S. Appl. No. 11/618,245, dated Feb. 25, 2009, 24 pages.

United States Patent and Trademark Office, "Non-final Office Action," issued in connection with U.S. Appl. No. 11/618,245, dated Jul. 3, 2013, 24 pages.

United States Patent and Trademark Office, "Final Office Action," issued in connection with U.S. Appl. No. 14/556,095, dated Jun. 16, 2016, 22 pages.

United States Patent and Trademark Office, "Non-final Office Action," issued in connection with U.S. Appl. No. 14/556,095, dated Nov. 5, 2015, 29 pages.

United States Patent and Trademark Office, "Non-final Office Action," issued in connection with U.S. Appl. No. 15/368,136, dated May 2, 2018, 37 pages.

United States Patent and Trademark Office, "Non-final Office Action," issued in connection with U.S. Appl. No. 15/368,136, dated May 4, 2017, 30 pages.

United States Patent and Trademark Office, "Non-Final Office Action," issued in connection with U.S. Appl. No. 16/790,721, dated Aug. 19, 2020, 16 pages.

United States Patent and Trademark Office, "Non-Final Office Action," issued in connection with U.S. Appl. No. 16/790,721, dated Jun. 23, 2021, 17 pages.

United States Patent and Trademark Office, "Notice of Allowance and Fees Due," issued in connection with U.S. Appl. No. 11/618,245, dated Aug. 19, 2014, 7 pages.

United States Patent and Trademark Office, "Notice of Allowance and Fees Due," issued in connection with U.S. Appl. No. 14/556,095, dated Aug. 30, 2016, 10 pages.

United States Patent and Trademark Office, "Notice of Allowance and Fees Due," issued in connection with U.S. Appl. No. 16/790,721, dated Dec. 13, 2021, 8 pages.

United States Patent and Trademark Office, "Notice of Allowance and Fees," issued in connection with U.S. Appl. No. 15/368,136, dated Mar. 27, 2019, 36 pages.

United States Patent and Trademark Office, "Non-Final Office Action," issued in connection with U.S. Appl. No. 16/428,313, dated Nov. 13, 2019, 10 pages.

United States Patent and Trademark Office, "Final Office Action," issued in connection with U.S. Appl. No. 16/428,313, dated Apr. 6, 2020, 12 pages.

United States Patent and Trademark Office, "Non-Final Office Action," issued in connection with U.S. Appl. No. 16/428,313, dated Oct. 27, 2020, 11 pages.

United States Patent and Trademark Office, "Final Office Action," issued in connection with U.S. Appl. No. 16/428,313, dated Feb. 23, 2021, 13 pages.

United States Patent and Trademark Office, "Non-Final Office Action," issued in connection with U.S. Appl. No. 16/428,313, dated Jul. 21, 2021, 12 pages.

United States Patent and Trademark Office, "Final Office Action," issued in connection with U.S. Appl. No. 16/428,313, dated Jan. 25, 2022, 14 pages.

United States Patent and Trademark Office, "Advisory Action," issued in connection with U.S. Appl. No. 16/428,313, dated Apr. 8, 2022, 3 pages.

United States Patent and Trademark Office, "Notice of Allowance and Fee(s) Due," issued in connection with U.S. Appl. No. 16/428,313, dated Jun. 9, 2022, 9 pages.

United States Patent and Trademark Office, "Non-Final Office Action," issued in connection with U.S. Appl. No. 16/790,721 dated Oct. 19, 2020, 15 pages.

United States Patent and Trademark Office, "Final Office Action," issued in connection with U.S. Appl. No. 16/790,721 dated Jan. 21, 2021, 16 pages.

United States Patent and Trademark Office, "Notice of Allowance and Fee(s) Due," issued in connection with U.S. Appl. No. 16/790,721 dated Mar. 22, 2022, 2 pages.

\* cited by examiner

METHODS AND APPARATUS FOR MONITORING THE INSERTION OF LOCAL MEDIA INTO A PROGRAM STREAM

CROSS-REFERENCE TO RELATED APPLICATIONS

This patent arises from a continuation of U.S. patent application Ser. No. 16/428,313, filed May 31, 2019, (now U.S. Pat. No. 11,477,496), which is a continuation of U.S. patent application Ser. No. 15/368,136, filed Dec. 2, 2016, (now U.S. Pat. No. 10,356,446), which is a continuation of U.S. patent application Ser. No. 14/556,095, filed Nov. 28, 2014, (now U.S. Pat. No. 9,544,622), which is a continuation of U.S. patent application Ser. No. 11/618,245, filed Dec. 29, 2006, (now U.S. Pat. No. 8,924,995), which is a continuation of PCT Patent Application Serial No. PCT/US2005/026426, filed on Jul. 25, 2005, which claims the benefit of U.S. Provisional Patent Application Ser. No. 60/590,626 filed Jul. 23, 2004. U.S. patent application Ser. No. 16/428,313, U.S. patent application Ser. No. 15/368,136, U.S. patent application Ser. No. 14/556,095, U.S. patent application Ser. No. 11/618,245, PCT Patent Application Serial No. PCT/US2005/026426, and U.S. Provisional Patent Application Ser. No. 60/590,626 are hereby incorporated by reference herein in their entirety.

TECHNICAL FIELD

The present disclosure pertains to audience measurement and, more particularly, to methods and apparatus for monitoring broadcast content including locally inserted media content.

BACKGROUND

The Society of Cable and Telecommunications Engineers (SCTE) is creating standards to define a method for seamlessly splicing different segments of digital content into a stream of digital data such as a broadcast program stream (e.g., a Digital Program Insertion standard (DPI)). These standards may enable a media provider (e.g., a television, radio, or Internet provider) to personalize and/or customize programming according to a consumer's tastes and preferences based on demographic data and the consumer's choices. For example, a digital bit stream containing television data may be received at a set top box (STB) or other receiving device at an end user's location and may contain digital indicators and/or cues to indicate a splicing point (e.g., a point in the program where digital content may be spliced). The STB may analyze the viewer's interests and/or demographic data and splice into the digital bit stream an appropriate advertisement and/or some other programming (e.g., special interest shows and/or informative messages) previously stored in the STB or received by the STB via a second digital bit stream. In other examples, the locally inserted content is not tied to the preferences of a particular end user, but is instead inserted for universal broadcast, for broadcast in a limited geographical area, etc.

This potential splicing activity presents a special challenge to audience measurement. (As used herein, audience measurement includes audience size and/or demographic measurement, content verification, commercial verification, program lineup verification, and content tracking for any type of media (e.g., television (digital, analog, cable, VOD, and/or satellite), radio, Internet, etc.)). Traditional content identification methods may not be sufficient to monitor such splicing activities. For example, a traditional method for television audience measurement monitors a television tuning status for channel identification and uses verified "as-run" logs (e.g., lists of television programs correlated with the television channels on which the television programs were broadcast and the times at which the television programs were broadcast) from networks and/or other programming sources to determine the identity of the television programming viewed. This method assumes that the viewed media content has not been altered, either before or during distribution because, if such alterations were to occur, the program logs may no longer accurately reflect the actual content that was received, displayed and viewed at a home.

More specifically, the use of splicing as defined in standards such as the DPI standard may allow television programming to be customized at a cable head-end, at the end user's location, or elsewhere in the distribution chain. As a result of such customization, the "as-run" logs may become inaccurate. Specifically, because the "as-run" logs are not designed to reflect the customization provided by local program insertion, the "as-run" logs may not accurately correlate program data and/or channel/time cross references and, thus, the "as-run" logs cannot be relied upon to accurately identify the media content consumed at an end user's location.

DETAILED DESCRIPTION

In the following, content that originates at the very start of the media distribution system will be referred to as "primary content." Media added (i.e., inserted, appended, etc.) to primary content anywhere along the media distribution chain will be referred to as "locally inserted content."

Figure 1:
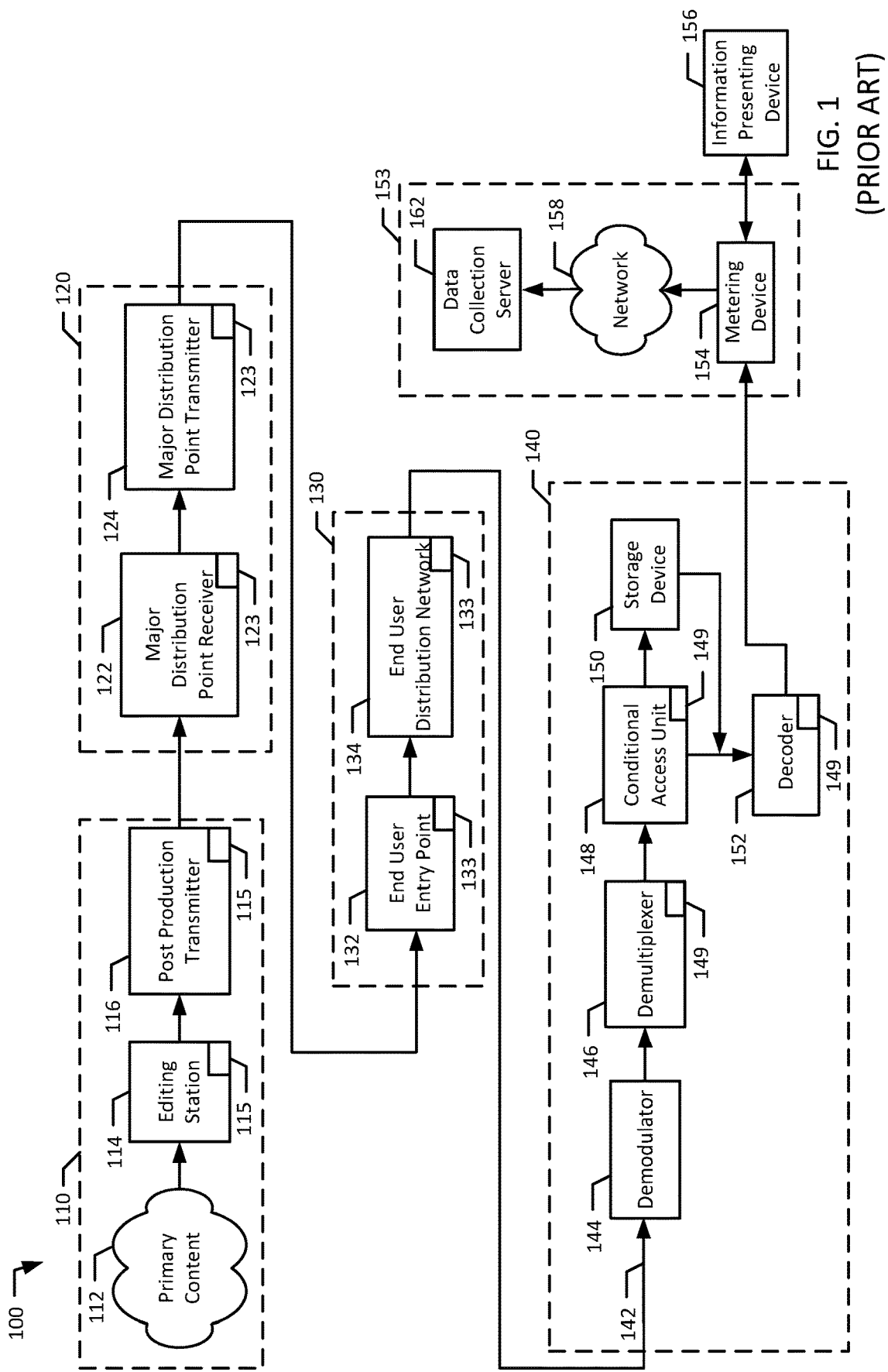
FIG. 1 is a block diagram of an example system to produce, transmit, receive, and view media content monitored by an example audience measurement system.
Figure 1A:
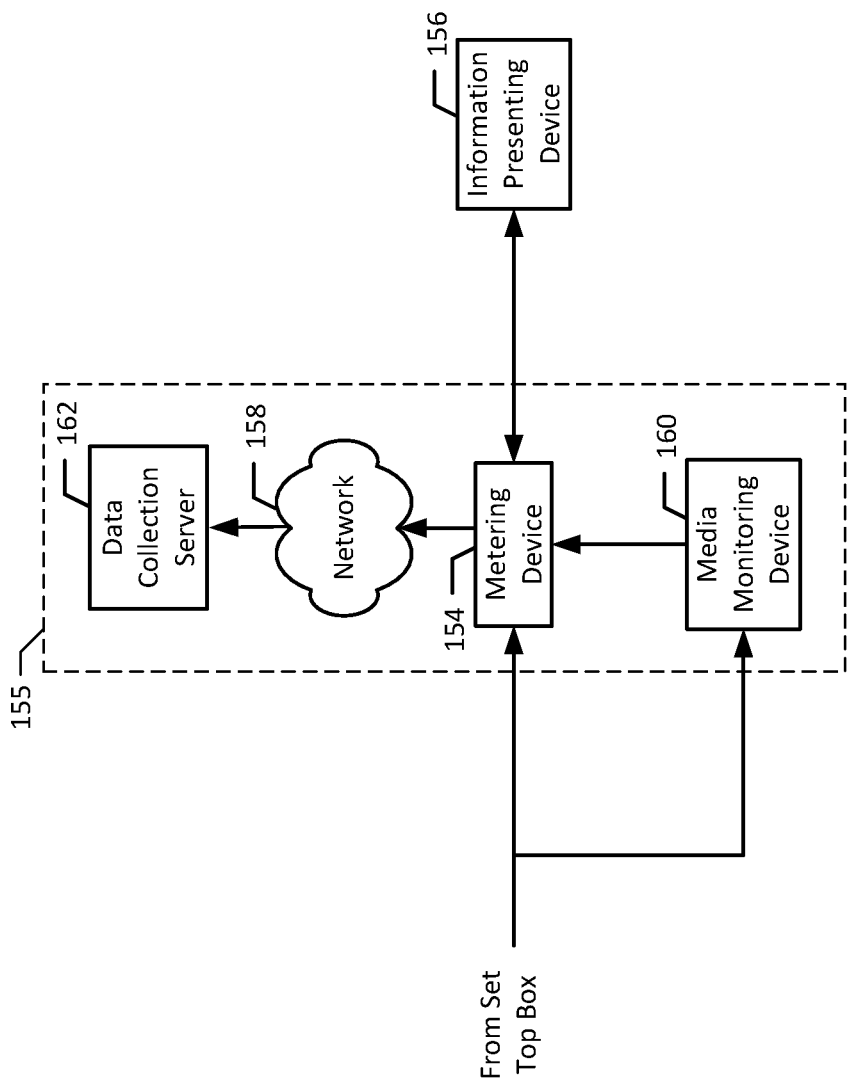
FIG. 1A is a block diagram of the example system of FIG. 1, additionally including a device to monitor tags that have been inserted into the media content.

In general, the disclosed audience measurement system 155 of FIG. 1A is adapted to monitor locally inserted media content presented on an information presenting device 156 and to monitor primary content in which local media content may be inserted. In other words, the disclosed methods and systems identify content (e.g., a television program, a radio program, etc.) presented by a monitored information presenting device 156 (e.g., a television, a radio, a stereo, a computer, etc.), whether the content is locally inserted anywhere along the media distribution chain or originated at the head-end of the media distribution chain. In addition to collecting data reflecting the identity of the content (primary and/or locally inserted) presented by an information presenting device 156, the disclosed methods and systems may also gather audience identification data to enable the creation of ratings information.

Before describing modifications employed to enable monitoring and identification of locally inserted content, the following describes a known media content distribution system 100 which may be monitored by a conventional audience measurement system 153.

FIG. 1 is a block diagram of a known media distribution system 100 that is configured to produce, distribute, and present media content. The example system 100 of FIG. 1 includes a post production site 110, a major media distribution point 120, an end user media distribution system 130, a set top box (STB) 140, and an information presenting device 156. The end user media distribution system 130 may be located in a household, business, government facility, or other location where end users view and/or listen to the content. The set top box may 140 be any type of receiving device capable of receiving and converting media content signals such as, for example, a set top box, a satellite receiver, a cable converter box, a cable decoder box, a subscription television receiver, a terrestrial receiver, a personal video recorder, an internet protocol television receiver, or a video cassette recorder. The set top box 140 and information presentation device 156 may be separate or may be located within a single physical housing. The media distribution system 100 is monitored by an audience measurement system 153 that includes a metering device 154, a communications network 158, and a data collection server 162. Persons of ordinary skill in the art will appreciate that the example of FIG. 1 is simplified in that multiple media distribution systems 110 and 120 and multiple end user media distribution systems 130 and STBs 140 (some or all of which may contain multiple information presenting devices 156) will actually be present and monitored.

The post production site 110 is a system configured to edit and transmit primary content 112. The post production site 110 includes an editing station 114 to edit primary content 112, one or more local content insertion module(s) 115 to insert local media content into the primary content 112, and a post production transmitter 116.

The primary content 112 may be any form of media content such as recorded programs intended to be broadcast by, for example, a cable, satellite, and/or terrestrial television network, a VOD system, and/or a radio station. The primary content 112 may be, for example, a television situational comedy, a news show, a television drama, a cartoon, a web page, an advertisement, a commercial, an audio program, interactive content, a movie, etc. The primary content 112 may also be referred to as "traditional content" or "original content."

The editing station 114 may be any apparatus to edit and/or compile the primary content 112. The editing station 114 may be used to perform any of a number of editing functions such as, for example, adjusting sound levels in the primary content 112, adjusting video quality and/or other characteristics in the primary content 112, removing or modifying segments of the primary content 112, etc. The editing station 114 may also be configured to compile segments of the primary content 112 (e.g., joining multiple segments of primary content 112) and/or to associate a first segment of primary content 112 with a different segment of primary content 112 (e.g., associating a soundtrack with a video segment).

In the illustrated example, the post production transmitter 116 receives the primary content 112 from the editing station 114, and transmits the primary content 112 and any inserted local content to one or more major media distribution point(s) 120. The post production transmitter 116 is configured to transmit the output of the editing station 114 (possibly after adding local media content via local content insertion module(s) 115) using any known transmission technique. For example, the data may be transmitted via a satellite connection, a wired connection (e.g., a network, a dedicated connection, the Public Switched Telephone Network (PSTN), the Internet, etc.) and/or a wireless connection. A person of ordinary skill in the art will readily appreciate that the post production transmitter 116 may be implemented using any known apparatus and methods and, thus, is not described in further detail herein.

In the illustrated example, the local content insertion module(s) 115 are configured to insert, append, or otherwise attach local media content into the primary content 112 received by the editing station 114 and/or the post production transmitter 116. In other words, the local content insertion module(s) 115 may be associated with either or both of the editing station 114 and the post production transmitter 116. The local content insertion module(s) 115 may operate in accordance with a standard such as the DPI standard to splice and/or multiplex the local media content into the received primary content 112. The local media content may be stored in the local content insertion module(s) 115 or in another device coupled to the local content insertion module(s) 115. Methods to splice and/or multiplex local media content into the received primary content 112 are well known to persons of ordinary skill in the art and are not further described herein. The local content insertion module(s) 115 may be structured to insert specific segments or programs (e.g., local media content) into the received primary content 112 at specific locations or non-specified locations based on user instructions, or based on predetermined values (e.g., rules driven by received demographic information), etc. The local media content may be updated periodically by software, manually by a user, and/or downloaded.

In the illustrated example, the major media distribution point(s) 120 (e.g., a cable head-end and/or a television network or local affiliate) are configured to receive media content signals (e.g., the primary content 112, possibly containing local media content added at the post production site 110) from the post production site 110 and/or other sources of media content, and to distribute the media content signal to one or more viewer's home(s). The major media distribution point 120 of the illustrated example includes a major distribution point receiver 122, one or more local content insertion module(s) 123, and a major distribution point transmitter 124.

The major distribution point receiver 122 is configured to receive the output of the post production site 110. To this end, the major distribution point receiver 122 is configured to receive signals transmitted in the format employed by the post production transmitter 116.

In the illustrated example, the local content insertion module(s) 123 are configured to insert local media content into the media content stream signal received by the major distribution point receiver 122 and/or into the signal received by the major distribution point transmitter 124. In other words, the local content insertion module(s) 123 may be associated with either or both of the major distribution point receiver 122 and the major distribution point transmitter 124. The local content insertion module(s) 123 are similar to the local content insertion module(s) 115 in the post production site 110.

In the illustrated example, the major distribution point transmitter 124 is configured to distribute the received media content stream, possibly including additional inserted local content, to a plurality of end users. The major distribution point transmitter 124 is configured to transmit the media content stream signal using any known broadcast technique such as a digital and/or analog radio or television broadcast, whether it be a terrestrial broadcast, a satellite broadcast, a cable transmission, an Internet broadcast, a VOD system, etc. The major distribution point transmitter 124 may also be configured to convert the format of the received media content stream before the media content stream is transmitted. For example, the received media content stream may be in an analog format but may be converted to a compressed digital format such as MPEG before being transmitted. A person of ordinary skill in the art will readily appreciate that the major distribution point transmitter 124 may be implemented using apparatus and methods that are well known in the art and, thus, are not described in further detail herein.

The end user media distribution system 130 of the illustrated example is configured to receive the media content stream from the major media distribution point 120 and to transmit the received media content stream to one or more locations within a viewer's home (e.g., one or more rooms, information presenting devices, televisions, computers, and/or radios). The end user media distribution system 130 of the illustrated example includes an end user entry point 132, one or more local content insertion module(s) 133, and an end user distribution network 134.

The end user entry point 132 of the illustrated example is configured to receive the media content stream (possibly containing content that was locally inserted at the post production site 110 and/or at the major media distribution point 120) from the major media distribution point 120. Thus, the end user entry point 132 may be configured to receive a digital and/or analog signal broadcast by a cable transmission system, a satellite broadcast system, a terrestrial broadcast system, the Internet, etc. The end user entry point 132 may be implemented using a terrestrial antenna, a satellite receiver dish, an analog and/or digital cable television input, a modem, etc.

The local content insertion module(s) 133 of the illustrated example are configured to splice, insert, append, and/or multiplex local media content into the media content stream received by the end user entry point 132 and/or into the media content signal received by the end user distribution network 134. In other words, a local content insertion module(s) 133 may be associated with either or both of the end user entry point 132 and the end user distribution network 134. The local content insertion module(s) 133 are similar to the local content insertion module(s) 115.

As mentioned above, the media content stream received at the end user media distribution system 130, is distributed to various locations in the consumer's household (e.g., to various information presenting devices 156 within the home) via the end user distribution network 134. The end user distribution network 134 of the illustrated example may be implemented using wiring or wireless systems within the household to connect set top boxes (STBs) 140, radios, low noise block downconverters (LNBs), data networks, computers, televisions, and/or other information presenting devices to the end user entry point 132, and/or may be implemented using a local area network (LAN) and/or another computer network (which may be a wired and/or a wireless network). In addition, the end user distribution network 134 may also include devices, such as repeaters, to amplify the media content signal, if needed.

The STB 140 of the illustrated example receives the media content signal from the end user distribution network 134 and may be configured to process the media content stream so that it is presentable on the information presenting device 156. The illustrated STB 140 receives an STB input signal 142 and includes a demodulator 144, a conditional access unit 148 (e.g., a Point of Deployment (POD) module), a demultiplexer 146, one or more local content insertion module(s) 149, a storage device 150, and a decoder 152.

The demodulator 144 of the illustrated example is configured to receive the STB input signal 142 from the end user media distribution network 130 and to extract a viewer selected program from the STB input signal 142. The STB input signal 142 may be a digital bit stream or data stream containing media content in a compressed digital format. For example, in a digital cable television or satellite television system, the demodulator 144 is configured to extract a program stream associated with a viewer selected program from the STB input signal 142. A person of ordinary skill in the art will readily appreciate that methods to extract a program stream from an STB input signal 142 are well known. The extracted program stream(s) may contain a video stream, an audio stream, and/or a data stream. The video and/or audio stream may not be viewable and/or audible without first processing the extracted stream(s).

The demultiplexer 146 of the illustrated example is configured to separate the audio, video, and data of the program stream tuned by the demodulator 144. The local content insertion module(s) 149 of the illustrated example are configured to splice, insert, append, and/or multiplex local media content into the media content stream received by the demultiplexer 146, into the media content stream received by the conditional access unit 148, and/or into the media content stream received by the decoder 152. In other words, the local content insertion module(s) 149 may be associated with any or all of the demultiplexer 146, the conditional access unit 148, and the decoder 152. The local content insertion module(s) 149 are similar to the local content insertion module(s) 115.

The conditional access unit 148 of the illustrated example is configured to receive and, if needed, decrypt the audio, video, and data streams extracted by the demultiplexer 146. The conditional access unit 148 of the illustrated example extracts keys from within the data stream and uses the keys and other locally stored data to decrypt the audio and/or video stream(s). A person of ordinary skill in the art will readily appreciate that processes for extraction of keys from the data stream and decryption of the audio and/or video stream(s) are well known to those of ordinary skill in the art. The decrypted audio and/or video stream(s) may not be in a format that is accessible by an information presenting device and may still be in a digital compressed format, such as MPEG. Streams in the compressed format will be decoded by decoder 152. The audio and/or video data streams are output from the conditional access unit 148 to the storage device 150 and/or to the decoder 152.

The storage device 150 of the illustrated example may be any device used to store digital and/or analog data. For example, the storage device 150 may be implemented by one or more hard drives, one or more compact disk (CD) drives, one or more digital versatile disk (DVD) drives, a random access memory (RAM) device, a non-volatile memory device (e.g., flash memory) and/or any other storage device. The storage device 150 may be configured to store the received media content stream and/or may be used to store local media content that may be used by the local content insertion module(s) 149. The storage device 150 can be broadband enabled and can receive local content through the Internet. For example, the storage device 150 may contain local content such as commercials, tutorial videos, special interest media content, etc. that may be inserted into the received media content stream by the local content insertion module(s) 149. As with the other local media insertion modules of FIG. 1, the local content may be randomly selected or may be selected based on a predetermined criterion, (e.g., based on the consumer's demographics, interests, previous selections/choices, etc.)

In the illustrated example, the decoder 152 receives the data, audio, and/or video streams from the demultiplexer 146 and/or the storage device 150. The illustrated decoder 152 is configured to decode and/or decompress the data, audio and/or, video streams so that the audio and/or video content can be presented for consumption on the information presenting device 156 and/or on one or more other devices. The decoder 152 may decode and/or decompress the audio, video, and data streams so that the media content stream is in a usable format such as the National Television Systems Committee (NTSC) television signal format, the phase alternating line (PAL) television signal format, the Advanced Television Systems Committee (ATSC) format, Moving Picture Experts Group (MPEG) format, Digital Video Broadcasting (DVB) format, the Digital Visual Interface (DVI) format, the High Definition Multimedia Interface (HDMI) format, etc. The decoded media content stream is output to the metering device 154, and/or to the information presenting device 156 and/or other display device(s).

As mentioned above, consumption of media distributed by the media content distribution system 100 is monitored by the audience measurement system 153. The audience measurement system 153 includes one or more metering device(s) 154. The illustrated metering device 154 is configured to receive the decoded media content stream output by the STB 140 to monitor the media content stream received by a monitored information presenting device 156 (e.g., a television, a radio, etc.). The metering device 154 may monitor various features and/or record various audience measurement data such as the tuning status of the information presenting device 156 (e.g., on/off status, channel tuned, etc.), program identification codes in one or more of the audio, video, and/or data streams, signatures (i.e., data which is characteristic of the tuned signal or its content) of one or more audio, video, and/or data streams, the identities or demographics of the audience members, etc. The exact logical or electrical location of the communications path from the metering device 154 to the information presenting device 156 will vary depending on the implementation.

The metering device 154 may be configured to generate audience measurement data using any known method(s) of monitoring a media content stream such as collecting watermark data, obtaining signature representation(s) of the received signal or content, and/or extracting ancillary codes embedded in the media content stream. Metering devices such as the metering device 154 are well known to those of ordinary skill in the art and will not be further described here.

The data collected by the metering device 154 is transmitted to a data collection server 162 via a network 158. The network 158 may be any type of communications network, such as the Internet, a telephone network, a cable network, and/or a wireless network.

In the following, modifications to the known media distribution system 100 and to the known audience measurement system 153 of FIG. 1 to enable metering of locally inserted content are described. In particular, tag encoder(s) are added to the distribution system 100 as shown in the examples of FIGS. 3-11 and a media monitoring device 160 is added to the audience measurement system 153, which is hereby referred to as the audience measurement system 155 when the media monitoring device 160 is included, as shown in FIG. 1A to detect and store identifying tags that have been embedded in the media data streams to identify locally inserted and/or primary content. An example media monitoring device 160 will be described in detail below.

Figure 2:
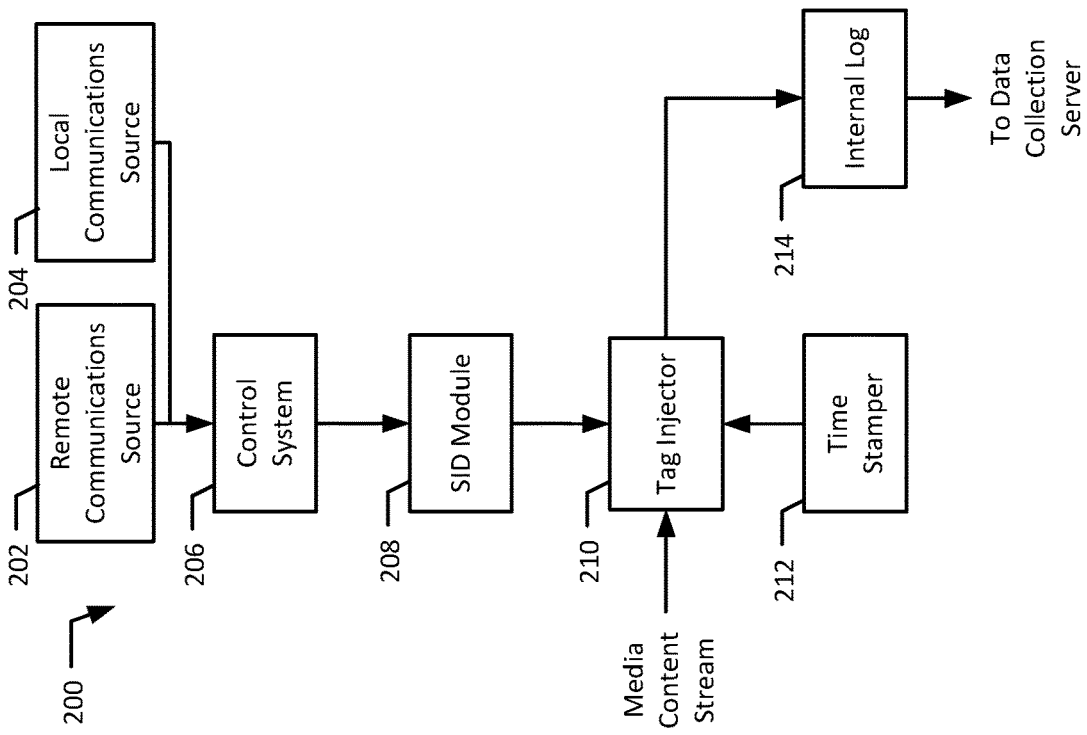
FIG. 2 is a block diagram of an example tag encoder to inject identifying data into media content.

FIG. 2 is a block diagram of an example tag encoder 200 to insert identification tags into a media content stream to uniquely identify each portion (e.g., second) and/or frame of content (primary and or locally inserted) contained in the media content stream. Preferably, the tag encoder 200 is structured to insert identification tags that identify one or more of: (a) the origin of a media segment (i.e., at what point in the media distribution process it was placed into the media stream), (b) the identity of the media segment, (c) the time and/or date at which the media segment was added to the media stream, etc. The example tag encoder 200 may be implemented as several hardware components each configured to perform one or more functions, may be implemented in software or firmware in which one or more programs are used to perform the different functions, or may be a combination of hardware, firmware, and/or software. The example tag encoder 200 is in communication with a remote communications source 202 and a local communications source 204 and includes a control system 206, a Source Identifier (SID) module 208, a tag injector 210, a time stamper 212, and an internal log 214. A Source Identifier ("SID") may be a static number or symbol assigned to a specific media distribution point or a dynamic number or symbol as the application requires.

The remote communications source 202 and the local communications source 204 are configured to gather data to be associated with the media content stream. The data provided by the remote and/or local communications sources 202 and 204 might include an identifier for the media source (i.e., physical location, media production time/date, media topic, etc.), an identifier for the media broadcast method (i.e., cable signal, satellite signal, terrestrial signal, etc.), and/or an identifier for the media broadcast channel (i.e., broadcast station call letters). The data received by the remote and/or local communications sources 202 and 204 may additionally include log files (local content description/identification, when, and where local content has been inserted) generated by the local content insertion modules 115, 123, 133 and 149. The log files may contain details regarding which sections of the primary content have been replaced with local content and/or the reasoning as to why the content was replaced. This data can be used to indicate that local content has been inserted and where that content was inserted. Data received from the remote communications source 202 and/or the local communications source 204 is provided to the control system 206 for processing. The local communications source 204 may be any source of data associated with the media content such as, for example, a local computer storing identification data, a person entering identification data, or any other source of identification data. The remote communications source 202 may be any type of data source that is not located at the same location as the example tag encoder 200. For example, the remote communications source may any of the data sources example provided for the local communications source 204 provided that data sources are located at a remote location such as a data collection center.

The control system 206 is configured to process data received from the remote communications source 202 and/or the local communications source 204. The remote and/or local communication sources 202 and 204 may transmit data that is related to media not currently being processed (i.e., media that will be broadcast in the future) and/or to media that is currently being processed. In order to eliminate extraneous data, the control system 206 determines whether the data received is relevant to the current media content stream. If the data is determined not to be relevant, it is ignored and/or stored for future use. If the data is determined to be relevant, the data is communicated to the SID module 208.

The SID module 208 of the illustrated example is configured to provide the tag injector 210 with a SID to be associated with a media content stream. As used herein, a SID is a unique source identifier that may include one or more of several predetermined identifiers, which uniquely identify media content (e.g., a predetermined serial number, an International Standard Audiovisual Number (ISAN), an ISAN combined with a version identifier (known as Versioned ISAN (V-ISAN)), a Moving Picture Experts Group (MPEG) Packet Identifier (PID), Industry Standard Coding Identification (ISCI), Advertising Digital Identification (AdID), house number, etc) and/or the source providing the media content. The SIDs may be pre-arranged with media content providers such that specific SIDs are associated with specific programs and/or commercials and/or with specific content providers. The SIDs stored in the SID module 208 may be updated and/or modified by software (e.g., by an automated download operation) and/or by a user update (i.e., manually).

The time stamper 212 of the illustrated example is configured to provide the tag injector 210 with current date and time information. The time stamper 212 may provide to the tag injector 210: the date and/or time a media content stream is received at the example tag encoder 200, the date and/or time that local content is injected into the media stream, and/or a time-in-creative, such as, for example, the time since the start of a given segment of content. A segment could be a commercial, program, chapter, program segment, or other desired section of content. The time-in-creative may be associated with the time the media content stream is broadcast (e.g., aired), the time the media content signal is created, and/or any other time of interest. The time stamper 212 may be queried by the tag injector 210 for the time and/or date information. The time stamper 212 may be similar to a real-time clock device and/or may be configured to store the date and/or time information as a number of seconds elapsed since a predetermined date. For example, the time stamper 212 may count the number of seconds elapsed since 12:00 AM, Jan. 1, 2000. Time stamper(s) 212 are well known to those of ordinary skill in the art and will not be further described herein.

The tag injector 210 of the illustrated example receives a media content stream and associates one or more identifying tags with the media content stream, the media content stream, and/or a program contained in the media content stream. The tag injector 210 is configured to receive data, via the control system 206, from the remote and/or local communications sources 202 and 204 (e.g., log files generated by the local content insertion modules 115, 123, 133, and 149 indicating local content description/identification, when, and where local content has been inserted), the SIDs and/or other identifying data from the SID module 208, and/or date and/or time information from the time stamper 212 to create the identifying tags. Thus, as used herein, an "identifying tag" comprises a SID that may be combined with a time and/or date stamp. The identifying tags may be encrypted using any known encryption algorithm or may be unencrypted. The tag injector 210 may also be configured to update an internal log 214 with any content identification tag(s) that are injected into the content signal so that the meaning of each identifying tag is recorded.

Regardless of the data (i.e., time/date stamp, SID, etc) used in creating the identifying tag, the tag injector 210 of the illustrated example associates the identifying tag with the media content stream by embedding the identifying tag within the media content stream. The tag injector 210 may use any known method of embedding information within the media content. For example, the tag injector 210 may insert the identifying tag using techniques similar to techniques used to insert ancillary codes into media content stream (see U.S. Pat. No. 5,629,739, which is hereby incorporated by reference, for an example code insertion system) and/or techniques used to insert watermark data (see U.S. Pat. No. 6,061,793, which is hereby incorporated by reference, for an example watermarking system).

The internal log 214 is configured to store identifying tags created by the tag injector 210. The internal log 214 may also store data that may be extracted from the media content stream, such as metadata. The internal log 214 may encrypt the identifying tag(s), compress the identifying tag(s), and/or sort the identifying tag(s) before and/or after inserting the identifying tag(s) into the internal log 214. The internal log 214 may continuously, periodically and/or aperiodically be transmitted to a data collection server, such as the data collection server 162 of FIG. 1, using any known communication protocol such as Internet Protocol or Xmodem.

Figure 3:
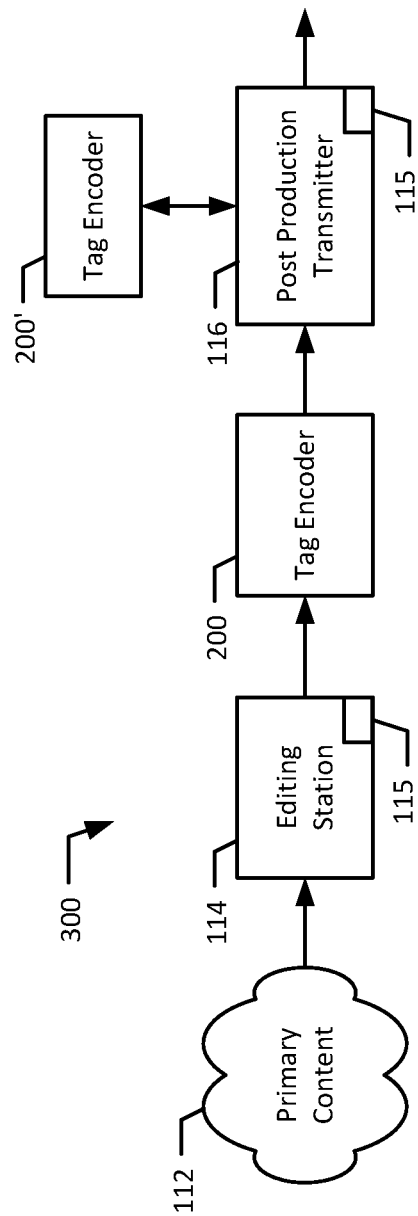
FIG. 3 is a block diagram of an example post production site implemented using the apparatus of FIG. 2.

FIG. 3 is a block diagram of an example post production site 300 implemented using the apparatus of FIG. 2. The post production site 300 may be substantially similar to the post production site 110 of FIG. 1. Thus, the post production site 300 includes an editing station 114, one or more local content insertion module(s) 115, and a post production transmitter 116 that may be identical to the primary content 112, the editing station 114, the local content insertion module(s) 115, and the post production transmitter 116 of FIG. 1, respectively. However, in order to encode primary content 112 and/or any inserted local media content with identifying tags so that the primary content 112 and/or any inserted local media content can be identified at a later time, the post production site 300 also includes one or more tag encoders 200 and 200'.

The tag encoders 200 and 200' are used to associate one or more identifying tags with the primary content 112 and/or with any locally inserted content. In the illustrated example, the tag encoder 200 is configured to receive the primary content 112 from the editing station 114 and to attach identifying tags to the primary content 112 and/or to any local content inserted by the local content insertion module(s) 115. The tag encoder 200' is configured to associate one or more identifying tags with the primary content 112 and/or with any local content inserted, for example, by the editing station 114 or the post production transmitter 116, immediately before or as the media signal is transmitted by the post production transmitter 116. The identifying tags inserted by the tag encoder 200' may be significantly similar to the identifying tags used by the tag encoder 200. The post production site 300 may employ one or both of the tag encoders 200 and 200'. The tag encoders 200 and 200' may use a SID associated with the post production site 300, a SID associated with the primary content 112, a SID associated with inserted local media content, and/or any other SID as described above.

Figure 4:
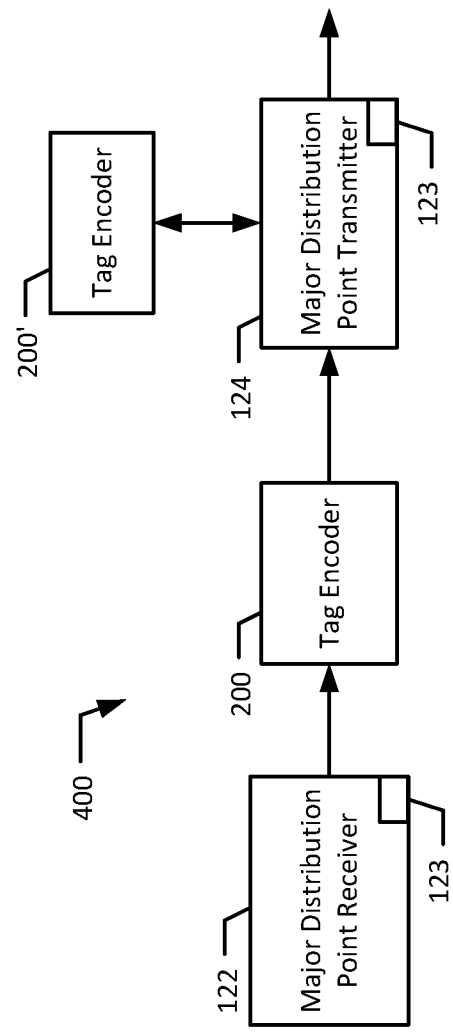
FIG. 4 is a block diagram of an example major media distribution system implemented using the apparatus of FIG. 2.

FIG. 4 is a block diagram of an example major media distribution point 400 implemented using the apparatus of FIG. 2. The major media distribution point 400 may be substantially similar to the major media distribution point 120. Thus, the major media distribution point 400 includes a major distribution point receiver 122, one or more local content insertion module(s) 123, and a major distribution point transmitter 124 that may be identical to the major distribution point receiver 122, the local content insertion module(s) 123, and the major distribution point transmitter 124 of FIG. 1, respectively. In addition, the major media distribution point 400 of FIG. 4 includes one or more tag encoder(s) 200 and 200', which may be identical.

The tag encoders 200 and 200' are configured to associate one or more identifying tags with the media content received by the major distribution point receiver 122, the media content output by the major distribution point transmitter 124, and/or any local media content that may be inserted by the local content insertion module(s) 123. The tag encoders 200 and 200' may use a SID associated with the major media distribution point 400, a SID associated with the media content received by the tag encoders 200 and 200', a SID associated with the local media content inserted by the insertion module(s) 123 or any other SID as described above. For example, the tag encoders 200 and 200' may use a SID associated with a television network, a local affiliate of the television network, and/or a cable television provider. The major media distribution point 400 does not need to use both of the tag encoders 200, 200', but may instead employ only one of the two tag encoders 200 and 200'.

Figure 5:
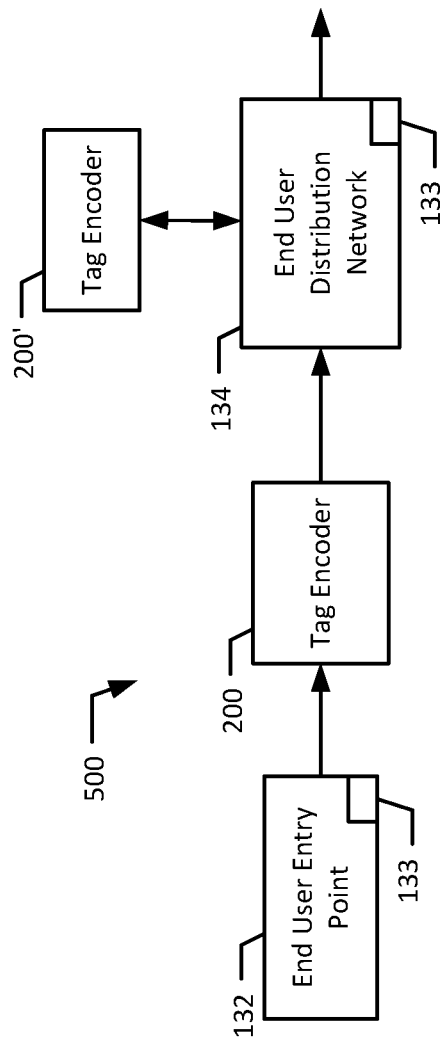
FIG. 5 is a block diagram of an example end user media distribution system implemented using the apparatus of FIG. 2.

FIG. 5 is a block diagram of an end user media distribution system 500 implemented using the apparatus of FIG. 2. In general, the end user media distribution system 500 is configured to receive media content, which may additionally contain local media content that has been inserted, associate one or more identifying tag(s) with the media content, insert local media content, and/or distribute the tagged media content to one or more locations and/or information presenting device(s) 156 at the end user's location. The end user media distribution system 500 of the illustrated example includes an end user entry point 132, local content insertion module(s) 133, and an end user distribution network 134 that are similar to the end user entry point 132, the local content insertion module(s) 133, and the end user distribution network 134 of FIG. 1, respectively. In addition, the illustrated end user media distribution system 500 includes two tag encoders 200 and 200'.

The tag encoders 200 and 200' are configured to associate one or more identifying tags with the media content received at the end user media distribution system 500 and/or with local media content inserted by the local content insertion module(s) 133. The tag encoder 200 is configured to receive the media content stream, which may include local media content that has been inserted into the media content stream by any of the local content insertion module(s) 133, from the end user entry point 132 and to associate one or more identifying tags with the media content. The tag encoder 200' is configured to receive the media content stream, which may include local media content that has been inserted into the media stream by any of the local content insertion modules 133, from the end user distribution network 134 and to associate one or more identifying tags with the media content. Although the example end user media distribution system 500 of FIG. 5 illustrates a system with two tag encoders 200 and 200', an example end user media distribution system 500 may be implemented using only one tag encoder (e.g., either the tag encoder 200 or the tag encoder 200').

Figure 6:
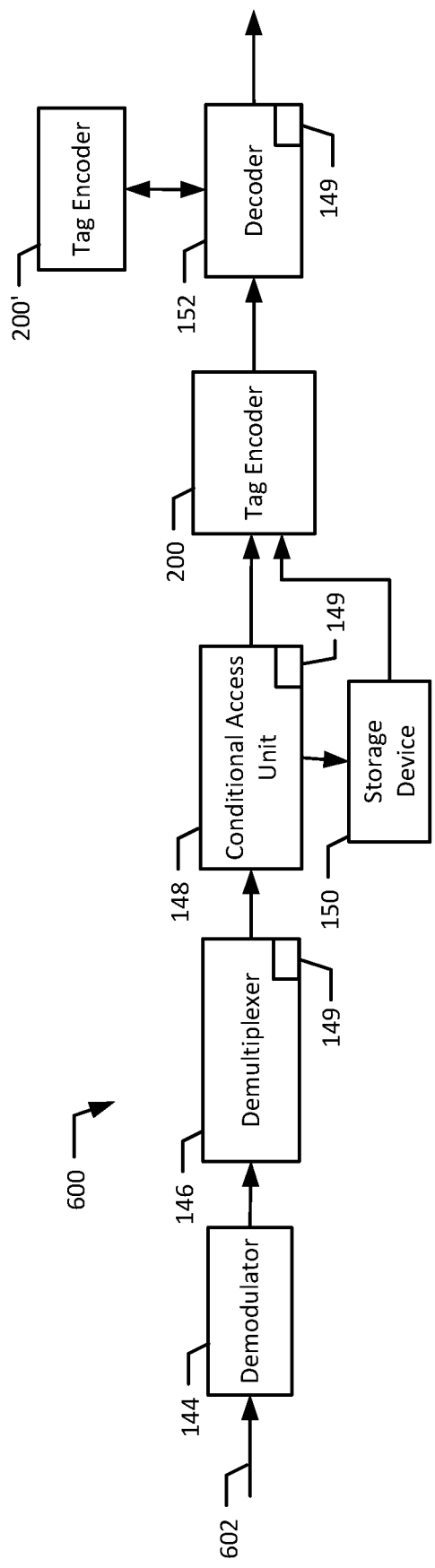
FIG. 6 is a block diagram of an example set top box implemented using the apparatus of FIG. 2.

FIG. 6 is a block diagram of an example STB 600 implemented using the apparatus of FIG. 2. In general, the STB 600 is configured to receive a media content stream and to decrypt and/or decode the media content stream so that the media content is viewable on a television and/or display device. The STB 600 may also be implemented to insert local media content and/or to tag any portion of the media content stream. The example STB 600 includes a STB input 602, a demodulator 144, a demultiplexer 146, local content insertion module(s) 149, a conditional access unit 148, a storage device 150 and a decoder 152 that are similar to the STB input 142, the demodulator 144, the demultiplexer 146, the conditional access unit 148, the local content insertion module(s) 149, the storage device 150 and the decoder 152 of FIG. 1, respectively. In addition, the example STB 600 includes the tag encoders 200 and 200'.

The tag encoder 200 is configured to receive decrypted audio, video, and/or data streams from the conditional access unit 148 and/or from the storage device 150 and to associate one or more identifying tags with the audio, video and/or data streams. The tag encoder 200' is configured to receive the decoded and/or decompressed audio and video content from the decoder 152 and to attach identifying tags to the audio and/or video content. It is common but not required to decompress and/or decrypt content prior to applying or extracting tags. The audio, video, and/or data streams may include local content that is inserted into the data streams by the local content insertion module(s) 149. Thus, the tags inserted by the tag encoder(s) 200 and 200' may alternatively or additionally be associated with that locally inserted content. The example STB 600 does not need to include both of the tag encoder(s) 200 and 200' and may instead include only one of the tag encoder(s) 200 or 200'.

Figure 7:
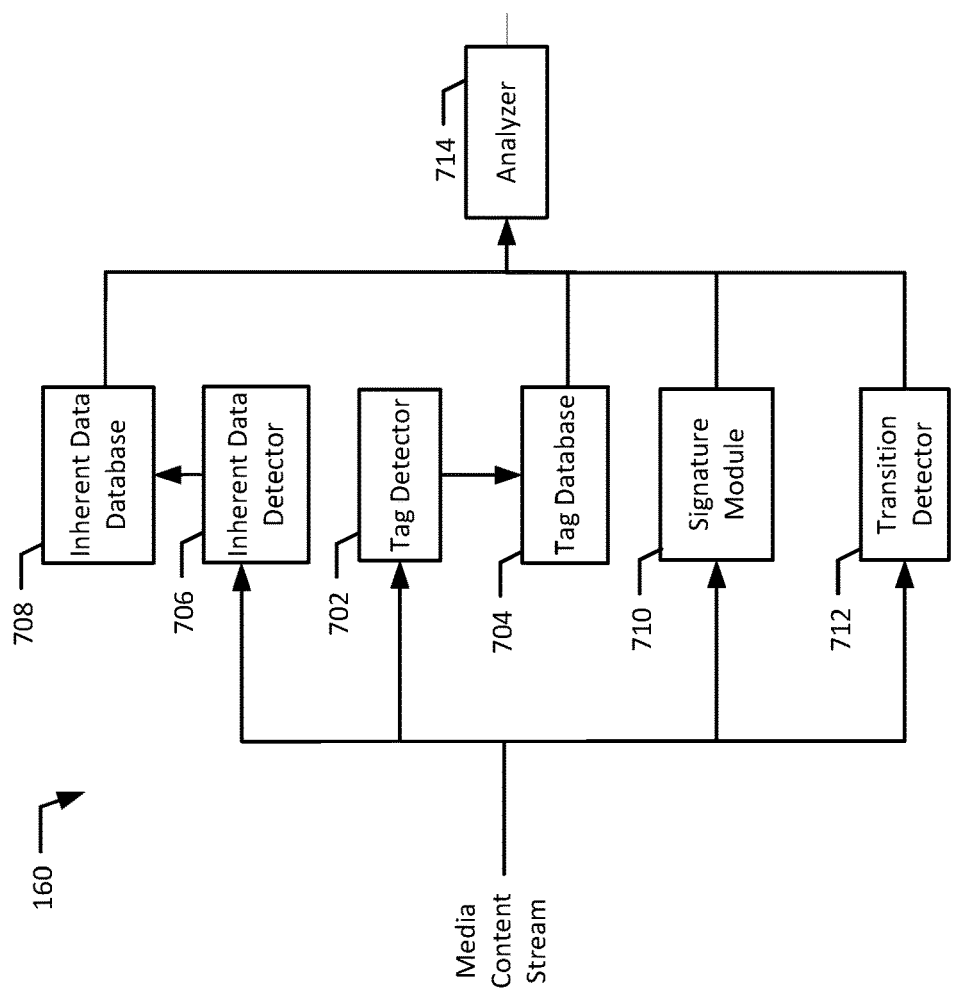
FIG. 7 is a block diagram of an example media monitoring device to detect identifying data and log content identification data.

FIG. 7 is a block diagram of an example media monitoring device 160, which may be incorporated into, coupled to, or otherwise associated with the metering device 154, to detect and log identifying tags. The example media monitoring device 160 may be implemented as several hardware components, each configured to perform one or more functions, may be implemented in software or firmware in which one or more programs are used to perform the different functions, or may be a combination of hardware, firmware, and/or software. The media monitoring device 160 of FIG. 7 includes a tag detector 702, a tag database 704, an inherent data detector 706, an inherent data database 708, a signature module 710, a transition detector 712, and an analyzer 714.

The tag detector 702 of the illustrated example is configured to receive media content tuned by a monitored information presenting device 156 and to detect identifying tags embedded in or otherwise associated with the media content by a tag injector such as, for example, the tag injector 210. The identifying tags are, preferably, the identifying tags used by the tag encoders 200 of FIGS. 2-6. A person of ordinary skill in the art will readily appreciate that any method to detect identifying tags may be used, and that the employed method(s) will depend on the type of tags employed and/or the method of attaching or embedding the tags into the content stream. As an example, if the tags are comprised of a serial number in an encrypted format, the tag detector may monitor the content stream for such data. When data encrypted in the predetermined format is discovered, the data is decrypted using an appropriate decryption algorithm and the serial number is extracted.

The tag detector 702 may be configured to store the identifying tags in the tag database 704. The contents of the tag database 704 are periodically or aperiodically transmitted to a data collection server such as the data collection server 162 of FIG. 1A for processing. The contents of the tag database 704 may be transmitted to the analyzer 714, a metering device 154 (see FIG. 1A), a data collection server 162 (see FIG. 1A), and/or other local equipment when a sufficient number of identifying tags have been collected, at predetermined times, continuously, or at any other suitable time. Any communication protocol may be used to transmit the contents of the tag database 704 to the data collection server such as, for example, Internet Protocol or Xmodem.

The inherent data detector 706 of the illustrated example is configured to receive media content and to extract content identification data, which is inherent in the media content stream, other than the inserted tag data and signature data. The content identification data extracted by the inherent data detector 706 includes codes and/or data that may be inserted into the media content stream by the media content creators and may be intended to be used for purposes such as asset management. In other words, said content identification data is not originally intended for audience measurement purposes. Examples of such content identification data include ISAN, V-ISAN, a network house number, transport stream identifiers, etc.

The inherent data detector 706 is configured to store the extracted content identification data in the inherent data database 708. The contents of the inherent data database 708 may be transmitted to the analyzer 714, a metering device 154 (see FIG. 1A), to a data collection server 162 (see FIG. 1A), and/or to other local equipment for processing when a sufficient amount of content identification data has been collected, at predetermined times, continuously, or at any other desired time interval. Any communication protocol may be used to transmit the contents of the inherent data database 708 to the data collection server such as Internet Protocol or Xmodem.

The signature module 710 is configured to receive the media content stream and to generate signature information based on the audio content, the video content, and/or the transport stream of the media content. Signature information may be useful, for example, if no identification tags are found in the content stream. Time stamp information may also be associated with the signature. A person of ordinary skill in the art will readily appreciate that there are several known methods to generate or collect signatures and any of these methods may be used by the signature module 710 (see U.S. Pat. No. 5,612,729, which is hereby incorporated by reference, for an example of generating a signature from the media content stream). The signature module 710 may also be configured to capture segments of raw media content (e.g., raw audio content, raw video content, and/or raw digital data). The signature module 710 may store the segments of the raw media content and the generated signatures along with (e.g., in association with) time stamp information.

The signature module 710 is configured to transmit the extracted or collected signatures and/or the captured segments of raw media content to the analyzer 714, a metering device 154 (see FIG. 1A), to a data collection server 162 (see FIG. 1A), and/or to other local equipment.

The data processing server 162 is configured to receive the generated signatures and the captured media content, and to attempt to determine the identity of the media content received by the signature module 710. The data processing server 162 has access to a database (e.g., a signature database) of known signatures and the associated program information (e.g., title, owner, etc.). The generated signatures are compared to the database of known signatures to determine the identity of the media content received by the signature module 710. The data processing server 162 may also be configured to compare the captured segments of raw media content to a database containing known segments of raw media content and associated program information or metadata (e.g., a raw media content database).

The signature database and the raw media content database may be updated using methods known to those of ordinary skill in the art. In addition, the signature database and the raw media content database may be updated to include entries for local content that may be inserted at a post production site 110, a major media distribution point 120, an end user media distribution system 130, and/or an STB 140. For example, a media monitoring device may be located near a point where local media content is inserted into a media content stream. The media monitoring device may recognize or identify the local media content that has been inserted into the media content stream by analyzing metadata associated with the inserted local media content. When inserted local media content has been detected, the media monitoring device may extract signatures using a signature module (e.g., the signature module 710). The extracted signatures and associated metadata identifying the media content represented by the signatures may then be transmitted to a data collection facility for addition to a signature database. The signature database may be compared with signatures extracted by another media monitoring device to identify media content received at the other media monitoring device. The locations of media monitoring devices will be described in further detail in conjunction with FIGS. 9-11.

The transition detector 712 of the illustrated example is configured to receive media content and to detect transitions between segments in the media content stream. The transition detector 712 may be configured to monitor the received media content stream and to detect packet identifiers (PIDs) associated with data streams in the media content. The transition detector 712 may also monitor a repetition rate and/or frequency associated with the PIDs. If the repetition rate changes, the transition detector 712 may indicate a change of programming has occurred and store information describing the change (e.g., the PID, the time, etc.). In addition, the absence of a PID and subsequent reappearance of a PID may also indicate a change of programming has occurred (e.g., insertion of a commercial). The transition detection 712 uses several methods for detection such as, changes in identifying tags, changes in content identification, changes in PIDs, etc. The transitions are useful in identifying the media content an audience is consuming.

The transition detector 712 may be configured to detect changes in the identifying tags and/or in the content identification data (e.g., content signatures and inherent identifying data) and to store the old and new values of the identifying tags and/or the old and new value of the content identification data. The time associated with the change of identifying tags and/or the change of the content identification data may also be recorded. A transition time (e.g., the time between receiving the old identifying tag value and receiving the new identifying tag value) is also stored and analyzed. The transition time is compared to a predetermined threshold to determine if a program transition occurred.

The transition detector 712 is also configured to detect changes in metadata that may be associated with the media content. For example, the transition detector 712 may analyze the metadata to determine changes in the metadata content (e.g., conditional access information, captioning data, parental guidance data, source data, etc.). Changes in the metadata content may indicate a program change. When a change is indicated by the change in the metadata, the date and/or time, and change in metadata content is recorded.

The transition detector 712 may also be configured to detect transitions in programs by monitoring a program map and/or a program association table associated with the received media content. The program map and/or the program association table are data tables that define the structure of the media content. Media content characteristics such as sound, picture and other metadata are included in the program map and/or the program association table. The transition detector 712 may determine when the media content characteristics in the program map and/or the program association table change and to determine, from these changes, that a program change has occurred. The transition 712 detector can also detect typical indications of media content splicing such as blank frames and/or quiet sections in the audio.

The transition detector 712 may also be configured to monitor software instructions used to control splicing and/or multiplexing of media content stream by local content insertion module(s) such as the local content insertion module(s) 115, 123, 133, 149 of FIGS. 1 and/or 1A. The transition detector 712 may alternatively or additionally detect data generated from software instructions used by the local content insertion module(s) 115 to splice and/or multiplex media content. The transition detector 712 may also be configured to detect changes within local content insertion module(s) 115 such as memory usage, CPU usage, input/output usage, and accesses to memory devices within the local content insertion module(s) 115. The transition detector 712 is configured to transmit the generated media content transition data to the analyzer 714.

The analyzer 714 is capable of receiving data from the inherent data database 708, the tag database 704, the signature module 710, and the transition detector 712. The analyzer 714 is further capable of analyzing the received data to identify locally inserted media content using data from one or more of the inherent data detector 708, the tag database 704, the signature module 710, and the transition detector 712. For example, the analyzer 714 may recognize a transition between programs using data from the transition detector 712 and may identify the program transitioned to using data from the tag database 704. The analyzer may transmit the results of the analysis to the metering device 154 (see FIG. 1A), to a data collection server 162 (see FIG. 1A), and/or to other local equipment. Alternatively, the analyzer 714 may transmit the results of the inherent data database 708, the tag database 704, the signature module 710, and the transition detector 712 to the metering device 154 (see FIG. 1A), to the data collection server 162 (see FIG. 1A), and/or to other local equipment. In an alternative implementation, the analyzer 714 may not be used and the components of the media monitoring device 160 may transmit data directly to the metering device 154 (see FIG. 1A), to the data collection server 162 (see FIG. 1A), and/or to other local equipment.

Figure 8:
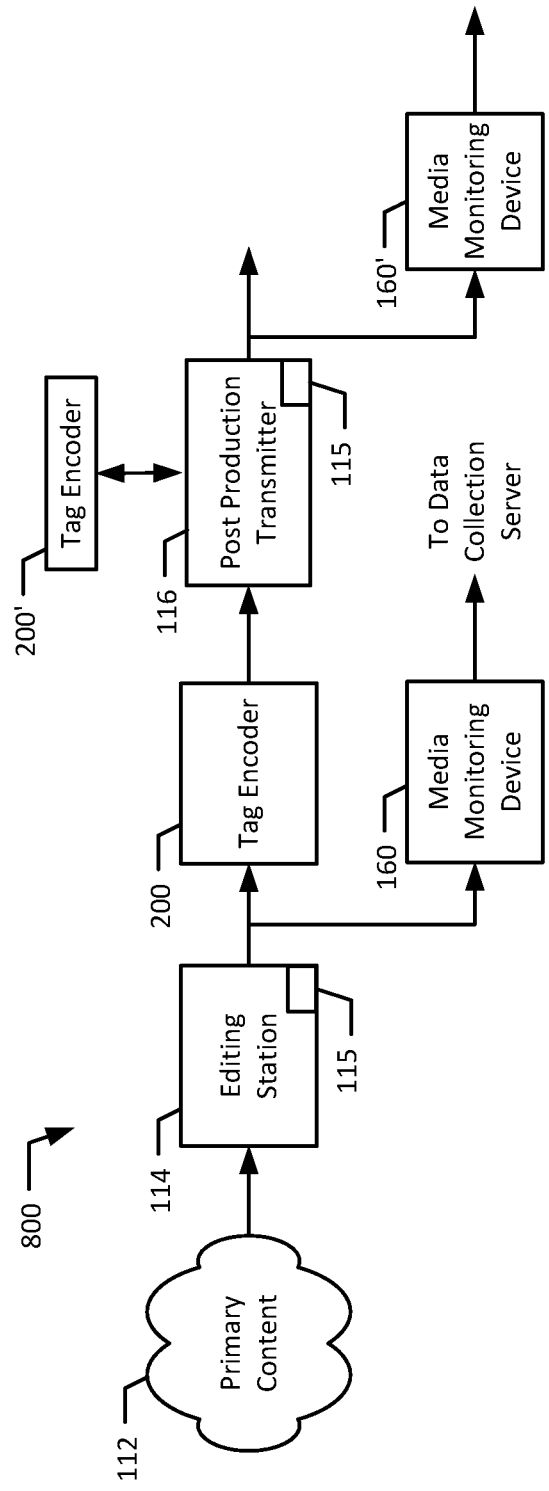
FIG. 8 is a block diagram of an example post production site implemented using the apparatus of FIG. 2 and FIG. 7.

FIG. 8 is a block diagram of an example post production site 800 implemented using the apparatus of FIG. 2 and FIG. 7. The example post production site 800 receives and processes primary content 112. To this end, it includes an editing station 114, local content insertion module(s) 115, a tag encoder 200, a post production transmitter 116, and a tag encoder 200' that are similar to the primary content 112, the editing station 114, the local content insertion module(s) 115, the tag encoder 200, a post production transmitter 116, and the tag encoder 200' of FIG. 3, respectively. In addition, the post production site 800 includes media monitoring devices 160 and 160'.

The media monitoring devices 160 and 160' are configured to detect identifying tags present in the content stream. In addition, the media monitoring devices 160 and 160' are configured to generate signatures and to detect program transitions and/or changes as described above in conjunction with FIG. 7. The media monitoring devices 160 and 160' are configured to transmit the detected identifying tags, generated signatures, and/or detected program transition information to a metering device 154, to data collection server 162, or to other local equipment. Similar to the tag encoders 200 and 200' of FIG. 3, it is not necessary for the post production site 800 to include both media monitoring devices 160 and 160'. Instead, the post production site 800 may include either the media monitoring device 160 or the media monitoring device 160'.

Figure 9:
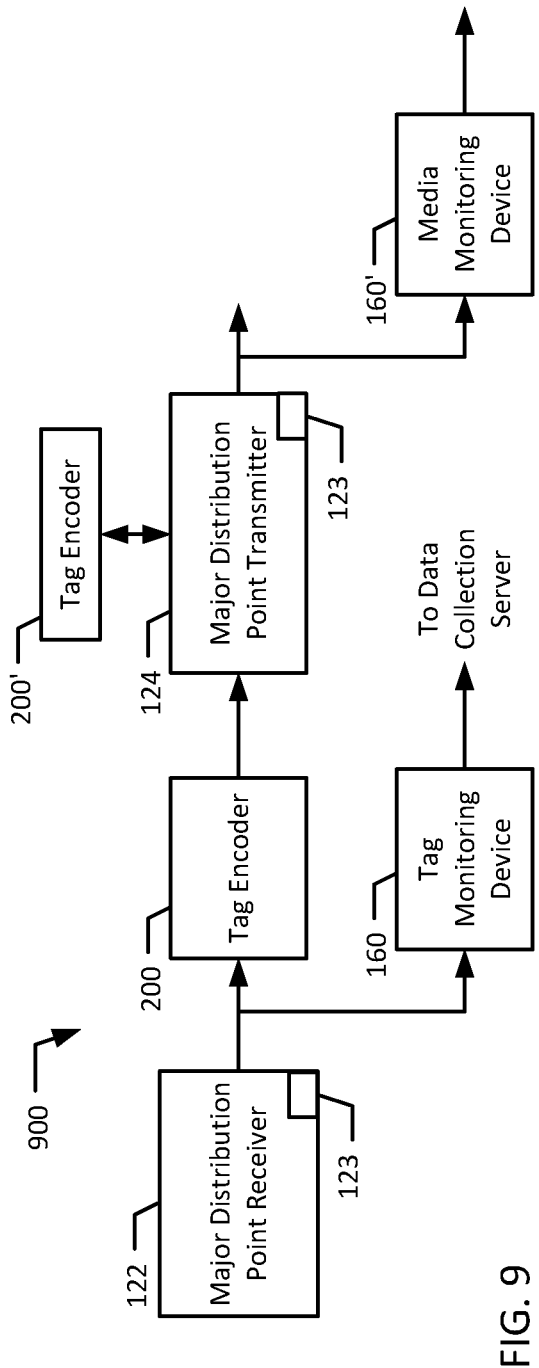
FIG. 9 is a block diagram of an example major media distribution system implemented using the apparatus of FIG. 2 and FIG. 7.

FIG. 9 is a block diagram of an example major media distribution point 900 implemented using the apparatus of FIG. 2 and FIG. 7. The major media distribution point 900 includes a major distribution point receiver 122, local content insertion module(s) 123, a tag encoder 200, a major distribution point transmitter 124, and a tag encoder 200' that are similar to the major distribution point receiver 122, local content insertion module(s) 123, the tag encoder 200, the major distribution point transmitter 124, and the tag encoder 200' of FIG. 4, respectively. The major media distribution point 900 also includes the media monitoring devices 160 and 160'.

The media monitoring devices 160 and 160' are configured to monitor identifying tags and/or content identification data associated with media content received by the major distribution point receiver 122 and transmitted by the major distribution point transmitter 124, respectively. The media monitoring devices 160 and 160' are also configured to generate signatures and to detect program transitions in the media content stream. The media monitoring devices 160 and 160' are configured to transmit detected identifying data, the content identification data, the generated signatures, and/or the program transition information to a metering device 154, to a data collection server 162, or to other local equipment. Similar to the tag encoders 200 and 200' of FIG. 3, the example major media distribution point 900 may not include both media monitoring devices 160 and 160' as shown in FIG. 9. Instead, the major media distribution point 900 may include only one of the media monitoring devices 160 and 160'.

Figure 10:
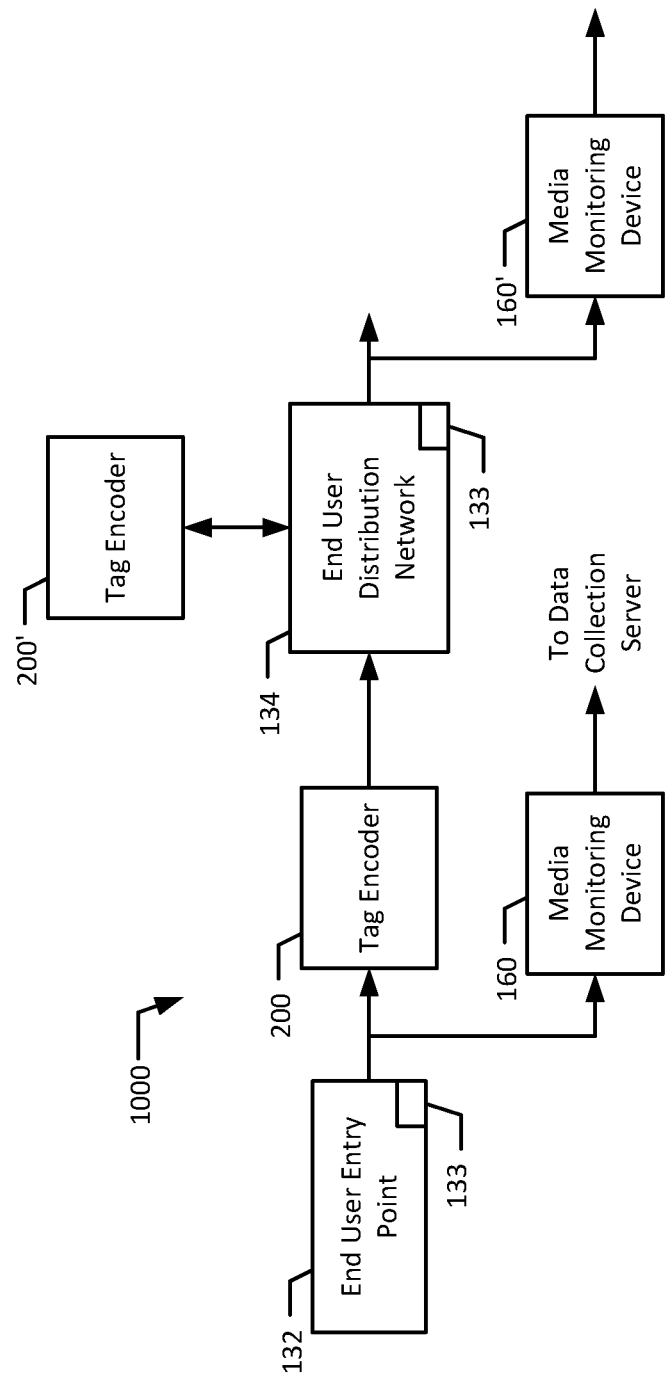
FIG. 10 is a block diagram of an example end user media distribution system implemented using the apparatus of FIG. 2 and FIG. 7.

FIG. 10 is a block diagram of an example end user media distribution system 1000 implemented using the apparatus of FIG. 2 and FIG. 7. The example end user media distribution system 1000 includes an end user entry point 132, local content insertion module(s) 133, a tag encoder 200, an end user distribution network 134, and a tag encoder 200' that are similar to the end user entry point 132, the local content insertion module(s) 133, a tag encoder 200, an end user distribution network 134, and a tag encoder 200' of FIG. 5, respectively. The example end user media distribution system 1000 also includes the media monitoring devices 160 and 160'.

The media monitoring devices 160 and 160' are configured to monitor identifying tags associated with media content received by the end user entry point 132. In addition, the media monitoring devices 160 and 160' are configured to generate signatures and to detect program transitions in the media content stream. The media monitoring devices 160 and 160' are configured to transmit detected identifying tags, generated signatures, and/or program transition information to metering device 154, to a data collection server 162, or to other local equipment. Similar to the tag encoders 200 and 200' of FIG. 5, the end user media distribution system 1000 may not include both of the media monitoring devices 160 and 160' as shown in FIG. 10. Instead, the media distribution system 1000 may include only one of the media monitoring devices 160 and 160'.

Figure 11:
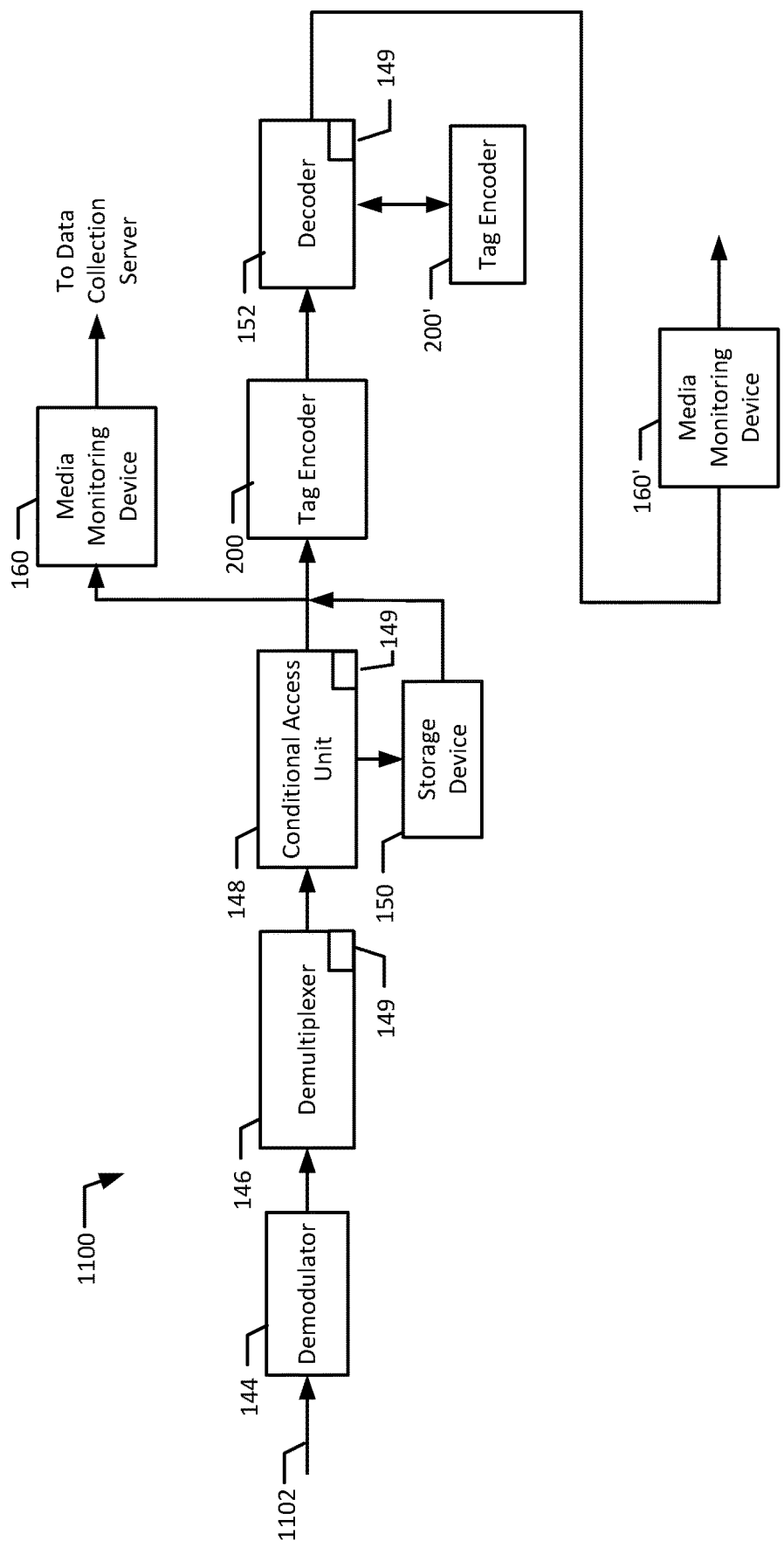
FIG. 11 is a block diagram of an example set top box implemented using the apparatus of FIG. 2 and FIG. 7.

FIG. 11 is a block diagram of an example STB 1100 implemented using the apparatus of FIG. 2 and FIG. 7. The example STB 1100 includes an STB input 1102, a demodulator 144, a conditional access unit 148, a demultiplexer 146, local content insertion module(s) 149, a tag encoder 200, a storage device 150, a decoder 152, and a tag encoder 200' that are similar to a STB input 602, the demodulator 144, demultiplexer 146, the conditional access unit 148, the local content insertion module(s) 149, the tag encoder 200, the storage device 150, the decoder 152, and the tag encoder 200' of FIG. 6, respectively. In addition, the example STB 1100 includes media monitoring devices 160 and 160'.

The media monitoring devices 160 and 160' are configured to monitor the media content stream received from the demultiplexer 146, the storage device 150, and/or the decoder 152 for identifying data and/or content identification data. In addition, the media monitoring devices 160 and 160' are configured to generate signatures based on the received media content and to detect program transitions and/or changes in the media content stream. The media monitoring devices 160 and 160' are configured to transmit collected identifying tags, generated signatures, and/or program transition information to a metering device 154, to a data collection server 162, or to other local equipment. The example STB 1100 may be implemented using either the media monitoring device 160 or the media monitoring device 160' or both.

Figure 12:
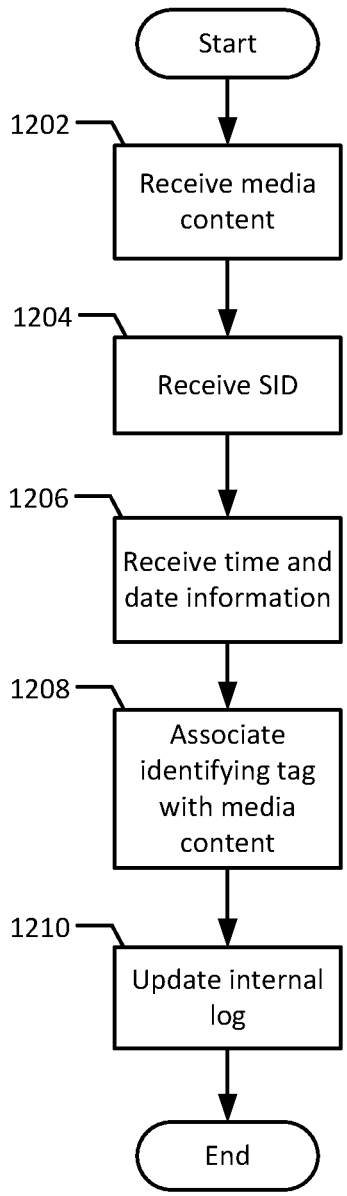
FIG. 12 is a flowchart representative of example machine readable instructions which may be executed to implement the system of FIG. 2.
Figure 13:
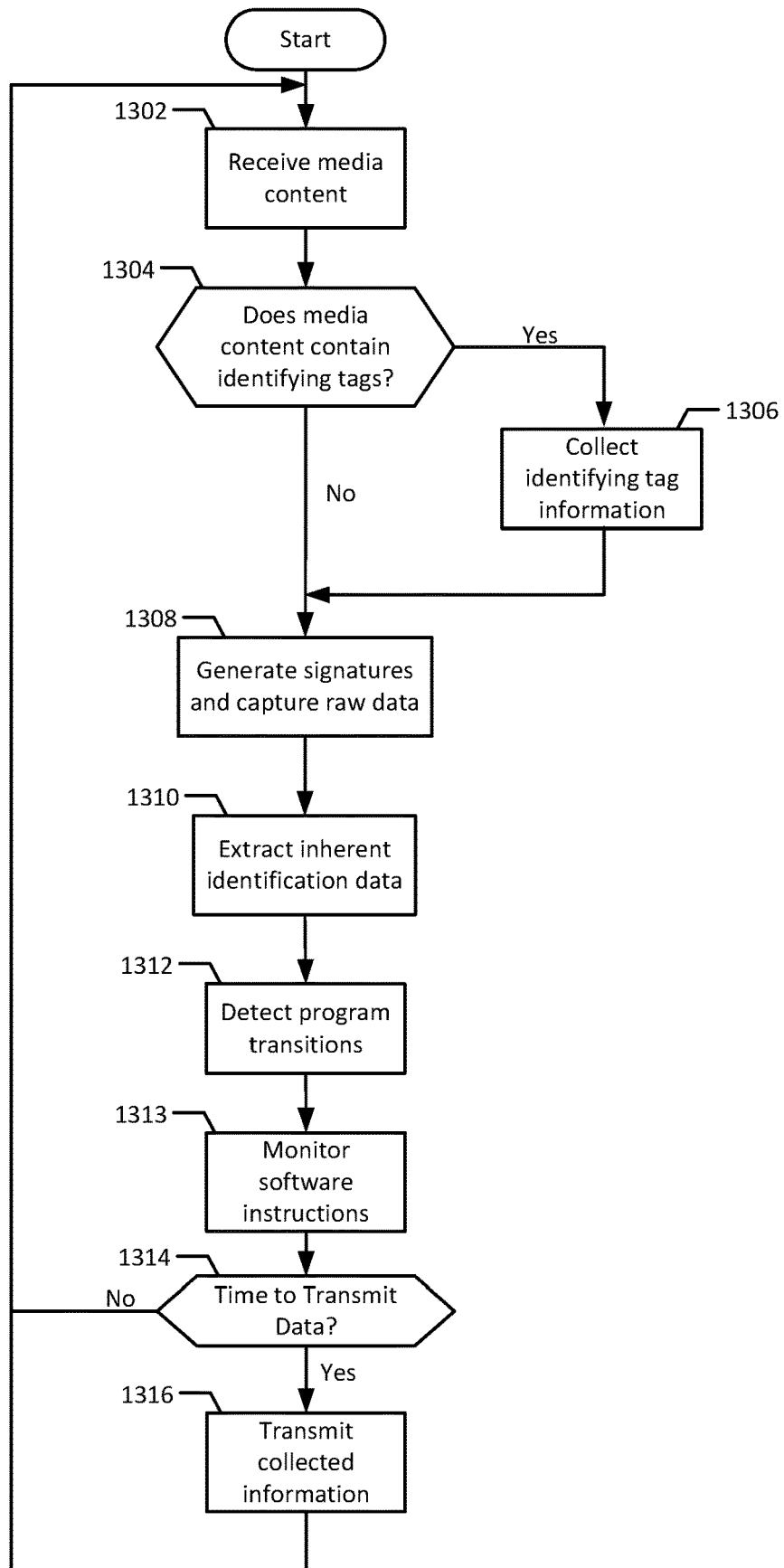
FIG. 13 is a flowchart representative of example machine readable instructions which may be executed to implement the system of FIG. 7.
Figure 14:
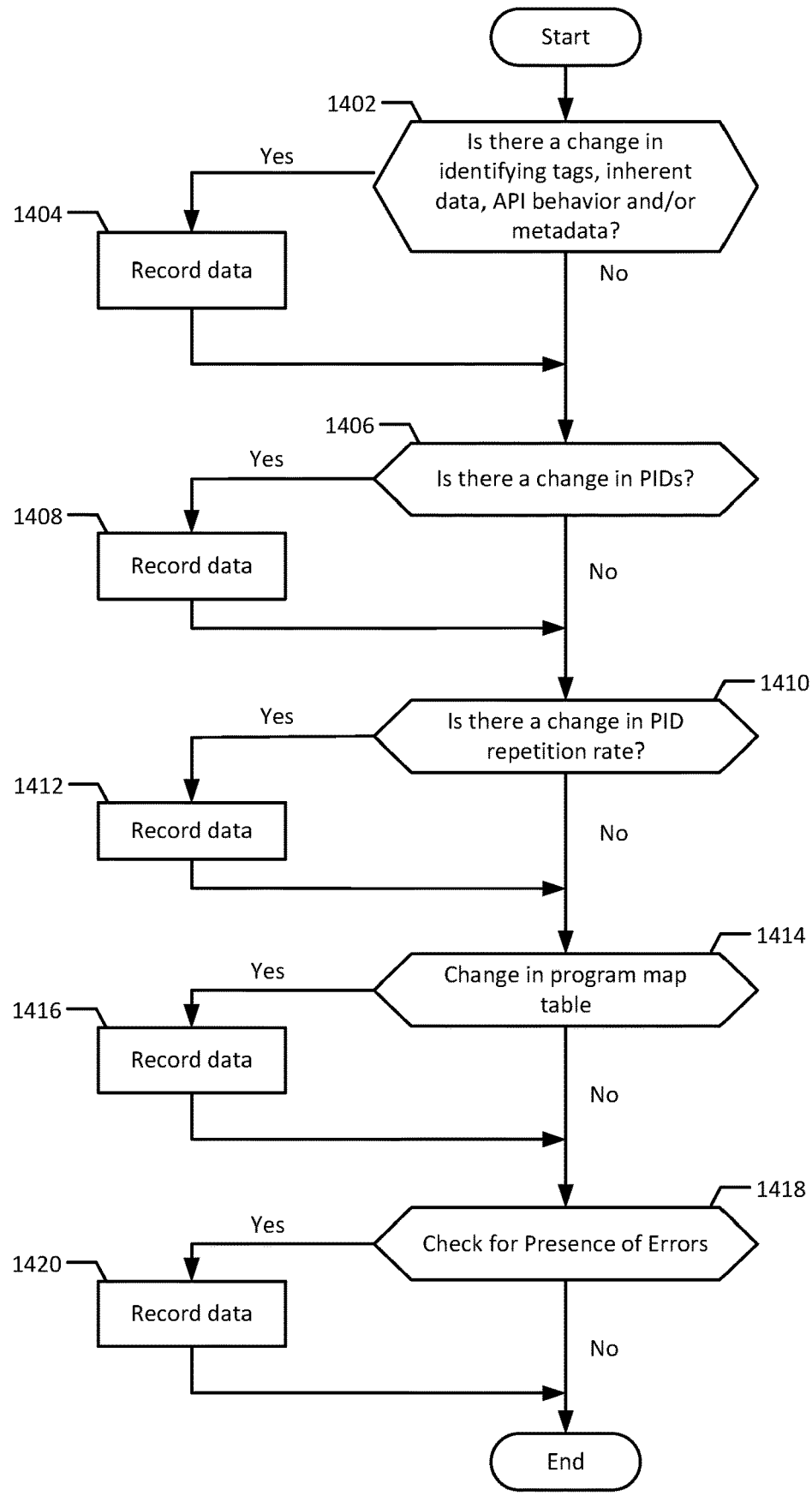
FIG. 14 is a flowchart representative of example machine readable instructions which may be executed to implement an example process to detect transitions.

FIGS. 12, 13 and 14 are flowcharts representative of example machine readable instructions that may be executed by the apparatus of FIGS. 2 and/or 7 to identify the primary content and local media content in a tuned program stream. The example processes of FIGS. 12, 13 and/or 14 may be implemented using one or more software programs that are stored in one or more memories (e.g., flash memory 1512 and/or hard disk 1520 of FIG. 15) and executed by one or more processors (e.g., processor 1506 of FIG. 15) in a well known manner. However, some or all of the blocks of the illustrated processes may be performed by firmware, by hardware, and/or manually. Although the processes are described with reference to the flowcharts illustrated in FIGS. 12, 13 and 14, a person of ordinary skill in the art will readily appreciate that many other methods of performing the processes may be used. For example, the order of many of the blocks may be altered, the operation of one or more blocks may be changed, blocks may be combined, blocks may be split, and/or blocks may be eliminated.

FIG. 12 is a flowchart representative of example machine readable instructions that may be executed to implement the tag encoder 200 of FIG. 2. The example process begins when a media content stream is received by the tag injector 210 of FIG. 2 (block 1202). The received media content stream may include local media content that is inserted prior to the tag injector 210 receiving it. The media content stream may be an analog signal (e.g., NTSC, PAL, etc.) or a digital signal containing bit streams and/or data streams.

The tag injector 210 receives a SID from the SID module 208 that is to be associated with the media content (block 1204). The SID may be a random number, a predetermined number, a number associated with received local content, ISAN information, V-ISAN information, an MPEG PID, any combination of the forgoing, etc. The tag injector 210 also receives time and date information from the time stamper 212 (block 1206). The time and date information may correspond, for example, to the time the media content stream is received.

The tag injector 210 uses the SID and the time and date information received in blocks 1204 and 1206 to form an identifying tag to be associated with the media content (block 1208). The identifying tag is associated with the media content by, for example, inserting the identifying tag into the media content using techniques similar to techniques used to insert watermark data and/or to insert ancillary codes into a media content stream. Identifying tags may be associated with the media content so that, for example, each segment, second, and/or frame of content of the media content stream is tagged and, thus, identified. Of course, less comprehensive tagging may be appropriate for some content.

After the identifying tag has been created and injected into the media content (block 1208), the tag injector 210 updates the internal log 214 (block 1210). The tag injector 210 stores the identifying tag (e.g., the SID and/or the date and time information used to create the identifying tag) in the internal log 214. The tag injector 210 may also store data extracted from the media content such as metadata information.

FIG. 13 is a flowchart representative of example machine readable instructions which may be executed to implement the monitoring device 160 of FIG. 7. The example process begins when the monitoring device 160 receives a media content stream (block 1302). The tag detector 702 analyzes the media content stream and determines if any identifying tags are associated with the media content (block 152). If the tag detector 702 determines there are no identifying tags associated with the media content (block 1304), control advances to block 1308. If the tag detector 702 determines there are identifying tags associated with the media content (block 1304), the tag detector 702 stores the identifying tags in the tag database 704 (block 1306).

The signature module 710 also receives the media content stream and generates signatures based on the audio content, video content, and/or transport streams (block 1308). In the example of FIG. 13, the signature module 710 also captures segments of raw data from the audio content, the video content, and/or the transport streams (block 1308). The generated signatures and/or segments of raw data are stored in the inherent data database 708 and transmitted at a later time, as described below.

Persons of ordinary skill in the art will readily appreciate that the position of blocks 1306 and 1308 may be reversed in FIG. 13 such that signature data is only collected if a tag is not detected.

The inherent data detector 706 then analyzes the media content stream and extracts any inherent identification data (e.g., data embedded in the signal that is not originally intended for audience measurement purposes) that may be embedded in the media content stream (block 1310). The extracted identification data is then stored in the inherent data database 708. After the inherent data detector 706 extracts the content identification data and stores the data in the inherent data database 708, the transition detector 712 analyzes the media content stream to identify a program transition and/or change (block 1312).

An example process 1400 to detect transitions is illustrated in FIG. 14. The example process 1400 begins when the transition detector 712 determines if there is a change in the values of the identification tags, the content identification data, API behavior, and/or metadata associated with the received media content stream (block 1124). The transition detector 712 may analyze the most recently captured identification tags, inherent data, and/or metadata and compare the values to values previously captured to determine if a change has occurred. If the transition detector 712 determines a change occurred (block 1402), the transition detector 712 stores the previous values, the most recently captured values, and the time associated with the change (block 1404).

The transition detector 712 then extracts PIDs from the media content stream and analyzes the PIDs to determine if a change in PID values has occurred (block 1406). If a change in PIDs is detected (block 1406), the previous PID, the current PID, and the time associated with the change is stored (block 1408). The transition detector 712 also detects the repetition rate of the PIDs and determines if the repetition rate and/or frequency of the PIDs changed (block 1410). The transition detector 712 may detect changes in the repetition rate by comparing a time difference between two PIDs and determining if the time difference is different than a predetermined threshold (e.g., a time difference). If the transition detector 712 determines a change in the repetition rate and/or frequency of the PIDs occurred (block 1410), the transition detector 712 stores the time associated with the change and the change in repetition rate (block 1412).

The transition detector 712 then analyzes the program map and/or the program association table and/or other logical structures associated with the media content stream to determine if a change occurred in the program map and/or the program association table (block 1414). The transition detector 712 may analyze the media content characteristics contained in the program map and/or the program association table and/or other logical structures to determine if any of the audio and/or video content has changed. If a change in the program map and/or the program association table is detected (block 1414), the transition detector 712 stores the time associated with the change and the program map and/or program identification tables (block 1416).

The transition detector 712 then performs integrity checks on the data (e.g., CRC, Checksum, etc.) to determine if errors are present (block 1418). The detector 712 also looks for a change in the level of errors present (e.g., a jump in the number of errors from 0 to 20). If a change in the presence of errors occurs (block 1418), the transition detector 712 records the information and time associated with the errors (block 1420). Control then returns to block 1313 of FIG. 13.

In addition to determining if a program change and/or transition has occurred (block 1312), the transition detector 712 monitors software instructions that may be used by local content insertion module(s) 115, 123, 133, and 149 to splice and/or multiplex local media content into the received media content stream (block 1313). The transition detector 712 may monitor the software instructions using available application programming interfaces (APIs) and analyze data that may be produced from the software instructions (e.g., return values from a software function). The transition detector may use a secondary API to monitor the splicing/multiplexing API for behavior changes that may indicate that a program transition has occurred. In addition, the transition detector 712 may also monitor the local content insertion module(s)' CPU usage, accesses to a memory device, input/output usage, etc.

After the transition detector 712 monitors the local content insertion module(s)' software instructions (block 1313), the tag detector determines whether it is time to export the collected data (block 1314). If not, control returns to block 1302. If so, the data collected by the tag detector 702, the inherent data detector 706, the signature module 710 and the transition detector 712 is transmitted to a data collection server 162 (block 1316). The collected data may be transmitted using any communication protocol such as Internet Protocol or Xmodem. After or while the collected data is exported, control returns to block 1302 to continue the monitoring process.

Figure 15:
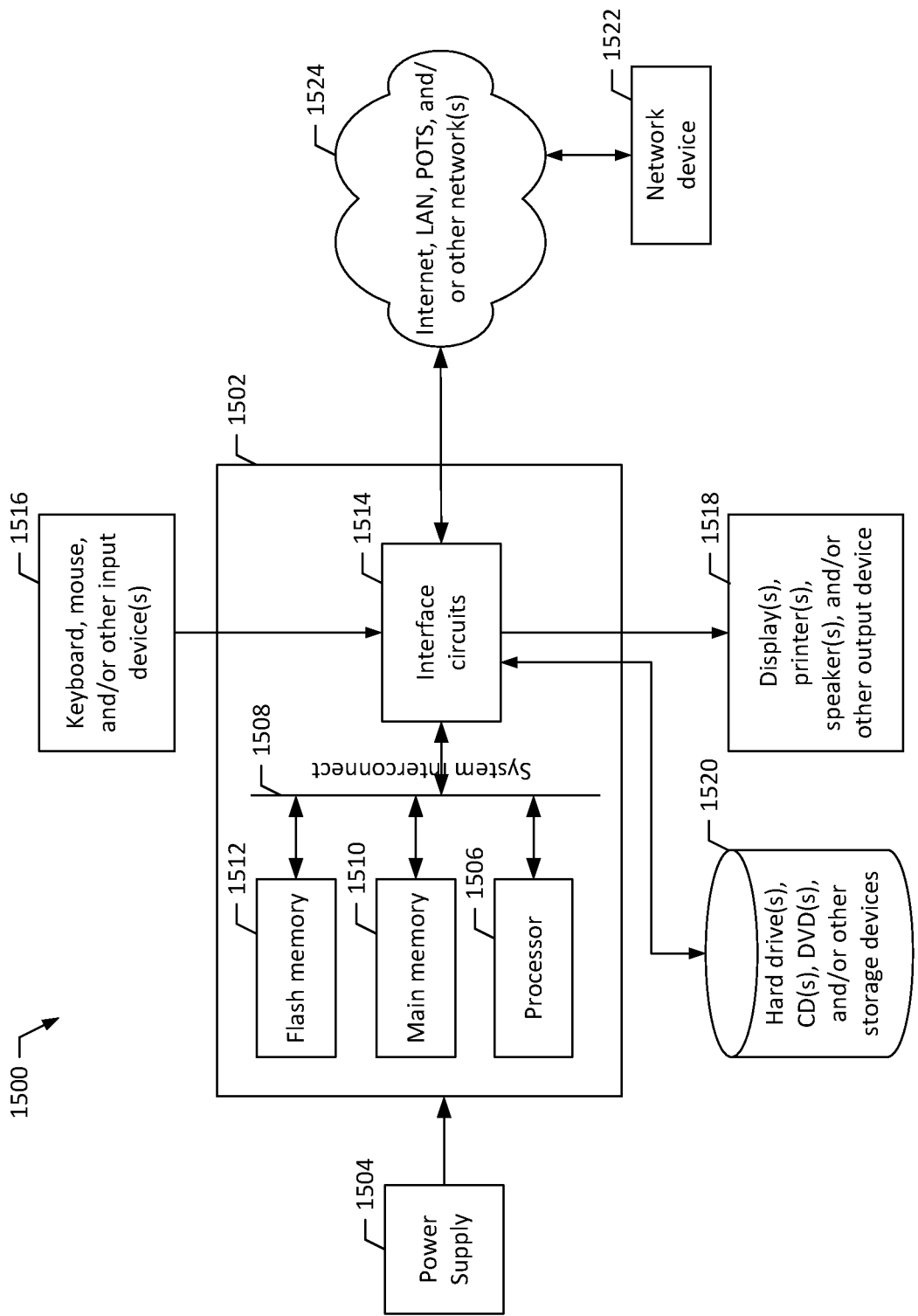
FIG. 15 is a block diagram of an example computer system that may execute the instructions represented by FIGS. 12, 13, and/or 14 to implement the apparatus of FIG. 2 and/or FIG. 7.

FIG. 15 is a block diagram of an example computer system that may be used to implement the disclosed apparatus. The computer system 1500 may be a personal computer (PC) or any other computing device. In the illustrated example, the computer system 1500 includes a main processing unit 1502 powered by a power supply 1504. The main processing unit 1502 may include a processor 1506 electrically coupled by a system interconnect 1508 to a main memory device 1510, a flash memory device 1512, and one or more interface circuit(s) 1514. In the illustrated example, the system interconnect 1508 is an address/data bus. Of course, a person of ordinary skill in the art will readily appreciate that interconnects other than busses may be used to connect the processor 1506 to the other devices 1510-1514. For example, one or more dedicated lines and/or a crossbar may be used to connect the processor 1506 to the other devices 1510-1514.

The processor 1506 may be any type of well known processor, such as a processor from the Intel Pentium® family of microprocessors, the Intel Itanium® family of microprocessors, the Intel Centrino® family of microprocessors, and/or the Intel XScale® family of microprocessors.

The interface circuit(s) 1514 may be implemented using any type of well known interface standard, such as an Ethernet interface and/or a Universal Serial Bus (USB) interface. One or more input devices 1516 may be connected to the interface circuit(s) 1514 for entering data and commands into the main processing unit 1502. For example, an input device 1516 may be a keyboard, mouse, touch screen, track pad, track ball, isopoint, a VTR deck, a digital media server, and/or a voice recognition system.

One or more displays, printers, speakers, and/or other output devices 1518 may also be connected to the main processing unit 1502 via one or more of the interface circuit(s) 1514. The display 1518 may be a cathode ray tube (CRT), a liquid crystal displays (LCD), or any other type of display. The display 1518 may generate visual indications of data generated during operation of the main processing unit 1502. The visual indications may include prompts for human operator input, calculated values, detected data, etc.

The computer system 1500 may also include one or more storage devices 1520. For example, the computer system 1500 may include one or more compact disk drives (CD), digital versatile disk drives (DVD), and/or other computer media input/output (I/O) devices.

The computer system 1500 may also exchange data with other devices 1522 via a connection to a network 1524. The network connection may be any type of network connection, such as an Ethernet connection, digital subscriber line (DSL), telephone line, coaxial cable, etc. The network 1524 may be any type of network, such as the Internet, a telephone network, a cable network, and/or a wireless network. The network devices 1522 may be any type of network devices 1522. For example, the network device 1522 may be a client, a server, a hard drive, etc.

Although the above discloses example systems, including software or firmware executed on hardware, it is understood that such systems are merely illustrative and are not to be considered as limiting. For example, it is contemplated that any or all of these hardware and software components could be embodied exclusively in hardware, exclusively in software, exclusively in firmware or in some combination of hardware, firmware, and/or software. In other words, although certain methods, apparatus, and articles of manufacture have been described herein, the scope of coverage of this patent is not limited thereto. On the contrary, this patent covers all apparatus, methods, and articles of manufacture fairly falling within the scope of the appended claims either literally or under the doctrine of equivalents.

What is claimed is:

1. A computing system comprising:
a processor; and
a non-transitory computer-readable storage medium, having stored thereon program instructions that, upon execution by the processor, cause performance of a set of operations comprising:
detecting, at a media device at an end user location, a frequency of a watermark that was spliced into a primary media stream received at the media device after the primary media stream was received at the end user location;
associating identifying tags with segments of the primary media stream that were spliced;
determining an advertisement associated with each of the segments of the primary media based on the identifying tags and received separately from the primary media;
presenting, by the media device, the primary media at a first time and the advertisement at second times; and
recording a log including first identifying information including an identity of a content of the primary media and second identifying information including a change in the frequency of the watermark corresponding to the advertisement.

2. The computing system of claim 1, the set of operations further comprising:
detecting the watermark by extracting the watermark from the primary media, and transmitting the log to a data collection facility.

3. The computing system of claim 1, the set of operations further comprising:
detecting the watermark by extracting a watermark from audio of the primary media.

4. The computing system of claim 1, wherein the end user location is a household.

5. The computing system of claim 1, wherein the media device is a television.

6. The computing system of claim 1, the set of operations further comprising:
determining the advertisement by determining the advertisement associated with a demographic associated with the end user location.

7. The computing system of claim 1, wherein the advertisement is received in a digital stream separate from transmission of the primary media to the end user location.

8. The computing system of claim 1, the set of operations further comprising:
splicing, at the media device, the advertisement into the primary media.

9. The computing system of claim 1, the set of operations further comprising:
generating a media stream including the primary media and the advertisement.

10. The computing system of claim 1, wherein the identity includes a title for the primary media.

11. A computing system comprising:
a processor; and
a non-transitory computer-readable storage medium, having stored thereon program instructions that, upon execution by the processor, cause performance of a set of operations comprising:
detecting, at a media device at a media presentation location, a plurality of cues in media received at the media device;
obtaining, separately from the media, an advertisement associated with a user of the media device;
presenting, by the media device, the media at a first time and the advertisement at a second time indicated by the at least one of the plurality of cues;
recording, based on presenting the advertisement at the second time, a log including first identifying information extracted from the media including at least two of: metadata identifying a content of the media, second identifying information for the advertisement, third identifying information to uniquely identify a first frame of the advertisement and a second frame of the advertisement, or fourth identifying information to identify a change in a frequency of the at least one of the plurality of cues in the media; and
transmitting the log to a data collection facility.

12. The computing system of claim 11, wherein the at least one of the plurality of cues is a Society of Cable and Telecommunications Engineers (SCTE) cue.

13. The computing system of claim 11, the set of operations further comprising:
   detecting the at least one of the plurality of cues by extracting a watermark from the media.

14. The computing system of claim 11, wherein the media presentation location is a household.

15. The computing system of claim 11, wherein the media device is a television.

16. The computing system of claim 11, the set of operations further comprising:
   determining the advertisement by determining the advertisement associated with a demographic the user.

17. The computing system of claim 11, wherein the advertisement is received in a digital stream separate from transmission of the media to the media presentation location.

18. The computing system of claim 11, the set of operations further comprising:
   splicing, at the media device, the advertisement into the media.

19. The computing system of claim 11, wherein the at least one of the plurality of cues comprises information indicating a specific location, within the received media, and wherein the indicated specific location within received media indicates the second time at which the advertisement is presented.

20. The computing system of claim 11, wherein the identifying information includes a type of the media.

* * * * *